(12) United States Patent
Tokiwa et al.

(10) Patent No.: US 9,289,837 B2
(45) Date of Patent: Mar. 22, 2016

(54) METHOD OF HOLDING BAND SAW BLADE BY MEANS OF BAND SAW BLADE GUIDE DEVICE, AS WELL AS BAND SAW BLADE GUIDE DEVICE

(75) Inventors: Toru Tokiwa, Kanagawa (JP);
Masatoshi Tanaka, Kanagawa (JP);
Susumu Tsujimoto, Kanagawa (JP);
Yuji Nagano, Kanagawa (JP)

(73) Assignees: AMADA COMPANY, LIMITED,
Kanagawa (JP); AMADA MACHINE TOOLS CO., LTD., Kanagawa (JP)

( * ) Notice: Subject to any disclaimer, the term of this patent is extended or adjusted under 35 U.S.C. 154(b) by 426 days.

(21) Appl. No.: 13/502,768

(22) PCT Filed: Oct. 5, 2010

(86) PCT No.: PCT/JP2010/067455
§ 371 (c)(1),
(2), (4) Date: Apr. 19, 2012

(87) PCT Pub. No.: WO2011/048943
PCT Pub. Date: Apr. 28, 2011

(65) Prior Publication Data
US 2012/0204700 A1    Aug. 16, 2012

(30) Foreign Application Priority Data

Oct. 20, 2009  (JP) ................. 2009-241594
Oct. 20, 2009  (JP) ................. 2009-241596
Oct. 20, 2009  (JP) ................. 2009-241603
Oct. 20, 2009  (JP) ................. 2009-241609
Oct. 20, 2009  (JP) ................. 2009-241615
Jan. 13, 2010  (JP) ................. 2010-004917

(51) Int. Cl.
*B23D 55/08* (2006.01)

(52) U.S. Cl.
CPC .......... *B23D 55/082* (2013.01); *Y10T 83/7264* (2015.04)

(58) Field of Classification Search
CPC ... B23D 55/082; B23D 55/086; B23D 47/005
USPC .................... 83/796, 820, 823–829
See application file for complete search history.

(56) References Cited

U.S. PATENT DOCUMENTS

| 4,258,601 | A | * | 3/1981 | Tanabe ............... 83/820 |
| 5,127,297 | A | * | 7/1992 | Ohnishi et al. ........ 83/820 |
| 5,271,306 | A | * | 12/1993 | Ohnishi et al. ....... 83/820 |
| 5,301,586 | A | * | 4/1994 | Ohnishi et al. ....... 83/820 |
| 5,408,910 | A | * | 4/1995 | Ohnishi et al. ....... 83/820 |
| 7,654,184 | B2 | * | 2/2010 | Aihara et al. ......... 83/788 |

FOREIGN PATENT DOCUMENTS

| JP | 56-69023 | 6/1981 |
| JP | 5-104326 | 4/1993 |
| JP | 2001-179535 | 7/2001 |
| JP | 2003-340640 | 12/2003 |
| JP | 2005-66713 | 3/2005 |

* cited by examiner

*Primary Examiner* — Laura M Lee
(74) *Attorney, Agent, or Firm* — Greenblum & Bernstein, P.L.C.

(57) ABSTRACT

In the process of holding a non-toothed section of a band saw blade between a fixed insertion block and a movable insertion block included in a band saw blade guide device, the movable insertion block is moved while a return allowing unit included in an insertion block moving unit is held in a returnable state, the insertion block moving unit configured to move the movable insertion block toward the fixed insertion block. The band saw blade is firmly held between the fixed insertion block and the movable insertion block. Thereafter, the entirety of the insertion block moving unit, including the return allowing unit, is fixed in an immovable state by a mechanical fixing unit.

5 Claims, 22 Drawing Sheets

FIG. 2
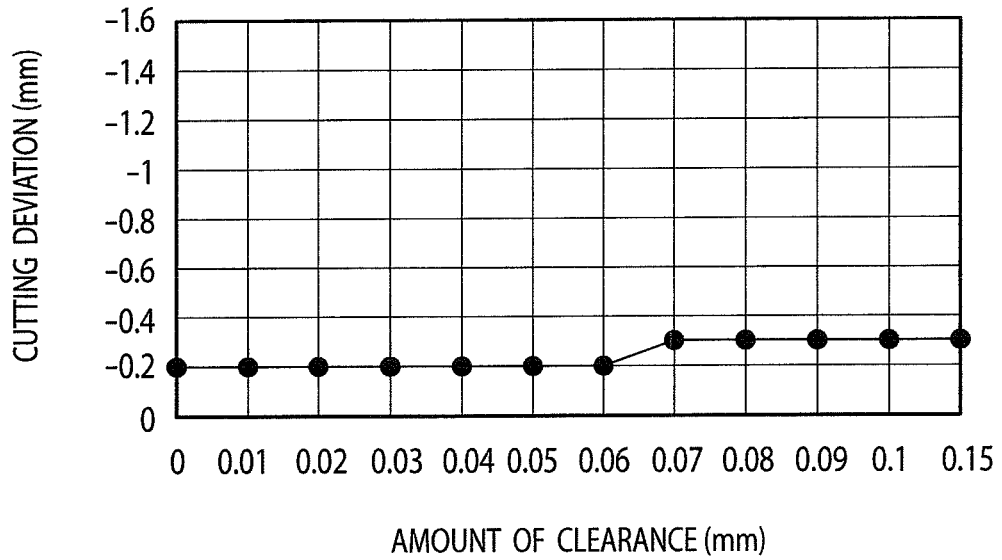
(A)
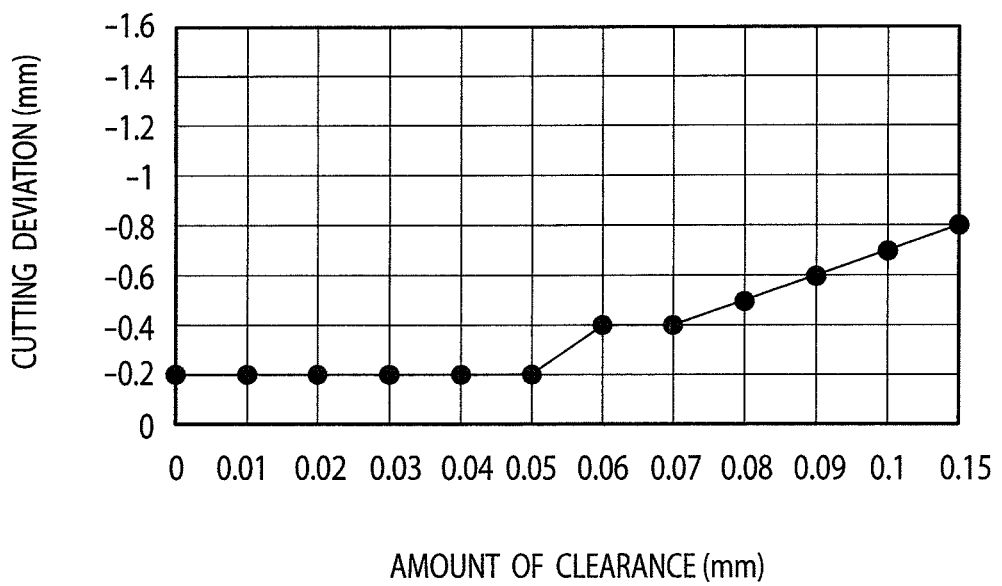
(B)

FIG.10
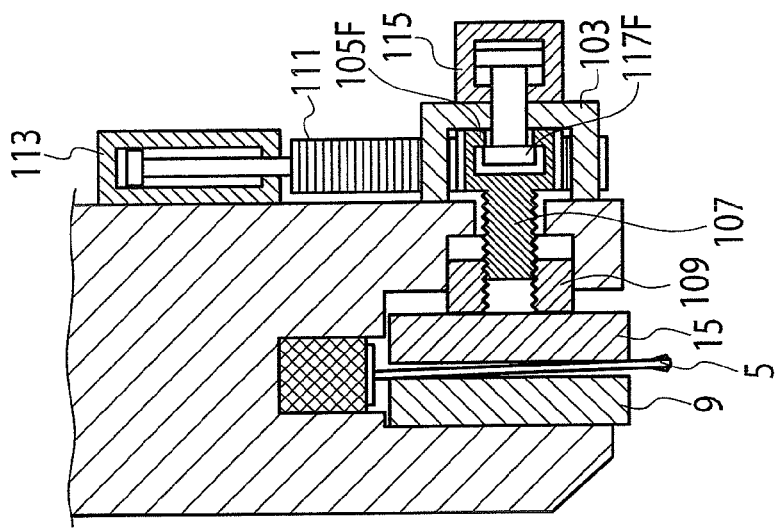
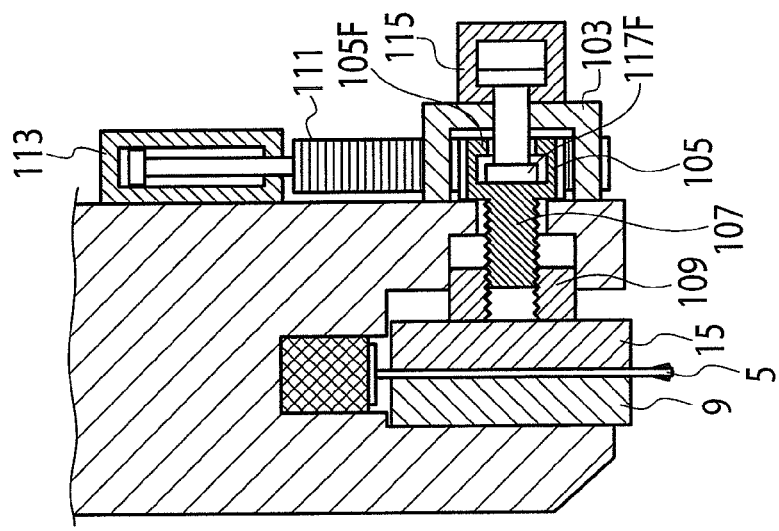
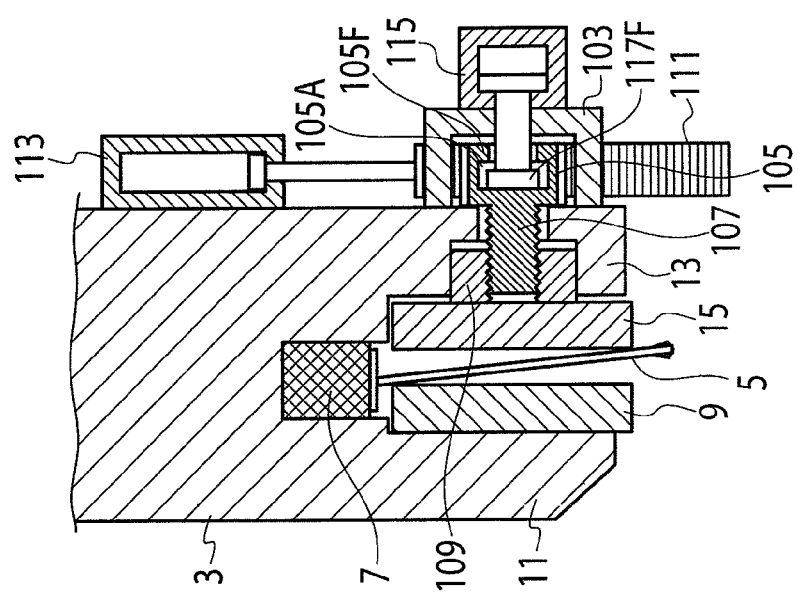

METHOD OF HOLDING BAND SAW BLADE BY MEANS OF BAND SAW BLADE GUIDE DEVICE, AS WELL AS BAND SAW BLADE GUIDE DEVICE

TECHNICAL FIELD

The present invention relates to a method of holding a band saw blade by means of a band saw blade guide device, and the band saw blade guide device, for a band saw machine. Specifically, the present invention relates to: a method of holding a band saw blade by means of a band saw blade guide device capable of always keeping the clearance between a fixed insertion block and a movable insertion block in the band saw blade guide device at an appropriate clearance, no matter how much a non-toothed section of the band saw blade varies in thickness from one type to another, when holding and guiding the non-toothed section of the band saw blade between the fixed insertion block and the movable insertion block; and the band saw blade guide device.

BACKGROUND ART

Band saw machines include Vertical band saw machines and horizontal band saw machines. Each of the vertical and horizontal band saw machines includes a band saw blade guide device configured to hold and guide the non-toothed section of the band saw blade from both sides at a location close to a workpiece in the process of cutting the workpiece with the band saw blade. The band saw blade guide device includes: a back portion supporting member configured to support and guide the back portion of the band saw blade; a fixed insertion block and a movable insertion block configured to hold the non-toothed section of the band saw blade therebetween to guide the non-toothed section; and an insertion block pressing unit configured to press the movable insertion block toward the fixed insertion block.

The conventional insertion block pressing unit generally employs either a configuration in which the movable insertion block is pressed by the rotation of an eccentric cam or a configuration in which the movable insertion block is pressed using a small hydraulic cylinder. The configuration using the eccentric cam is designed to always move the movable insertion block toward the fixed insertion block up to the same position. For this reason, when the clearance between the fixed insertion block and the movable insertion block is set at an appropriate clearance corresponding to the a band saw blade with a thin non-toothed section, the configuration has a problem of holding another band saw blade with a thick non-toothed section too firmly between the fixed insertion block and the movable insertion block. Conversely, when the clearance has been set corresponding to a band saw blade with a thick non-toothed section, a large clearance occurs between another band saw blade with a thin non-toothed section and each of the insertion blocks. In this case, the band saw blade tilts, so that cutting deviation is likely to occur.

In the configuration in which the movable insertion block is pressed using the small hydraulic cylinder, the non-toothed section of the band saw blade is always firmly held between and guided by the fixed insertion block and the movable insertion block regardless of the thickness of the non-toothed section of the band saw blade. For this reason, this configuration has problems that the two insertion blocks wear out very much, and that the power for driving the band saw blade is large.

Against this background, a technique is employed in which the movable insertion block is slightly returned after the non-toothed section of the band saw blade is firmly held between the fixed insertion block and the movable insertion block. For example, an aspect disclosed in Patent Document 1 uses this technique.

In the configuration described in Patent Document 1 above-mentioned, as shown in FIG. 1, a; the non-toothed section of a band saw blade 1057 is firmly held between a fixed insertion block 1055 and a movable insertion block 1051 by moving the movable insertion block 1051 toward the fixed insertion block 1055 by a hydraulic cylinder 1053 via a lever 1054; and thereafter, the movable insertion block 1051 is slightly returned by sucking the pressure oil in the hydraulic cylinder 1053 into a small cylinder 1061 in a booster 1059. With this configuration, the clearance between the fixed insertion block 1055 and the movable insertion block 1051 can be kept at an appropriate clearance regardless of the thickness of the non-toothed section of the band saw blade 1057.

Here, assume that: the clearance is regarded as appropriate when a value of the clearance dimension is 0.05 mm, which is obtained by subtracting the thickness dimension of the band saw blade 1057 from a gap dimension between the fixed insertion block 1055 and the movable insertion block 1051; and that the invention described in Patent Document 1 mentioned above is applied to an actual band saw machine. If the lever ratio of the lever 1054 is 1:2, the piston of the hydraulic cylinder 1053 needs to be retracted by 0.1 mm in order to retract the movable inserting block 1051 by 0.05 mm after the band saw blade 1057 is firmly held between the fixed insertion block 1055 and the movable insertion block 1051.

In this case, if the diameter and main pressure of the hydraulic cylinder 1053 are, respectively, 10 mm and 50 kgf, the clamping force of the movable insertion block 1051 is 0.785 cm$^2$ (the cross-sectional area of the cylinder)×50 kgf/cm$^2$ (the main pressure)×2 (the lever ratio)=78.5 kgf. From this, the amount of oil needed to retract the piston of the hydraulic cylinder 1053 by 0.1 mm is 0.01 cm×0.785 cm$^2$=0.00785 cm$^3$=0.785 cc. As a result, approximately 0.8 cc of pressure oil needs to be discharged from the hydraulic cylinder 1053.

Although the minuscule amount of pressure oil, i.e., the approximately 0.8 cc is discharged after the band saw blade 1057 is held and pressed with a pressure of the 78.5 kgf as described above, the band saw blade 1057 may not be released from being held or pressed in some cases, with only the pressure decreasing. Specifically, the pressure oil used for the hydraulic system generally contains minuscule amounts of gases including air, and it is highly likely that the minuscule amounts of gases merely increase in volume. For this reason, the configuration using the hydraulic cylinder has the problem in actual use.

PRIOR ART DOCUMENT

Patent Document

Patent Document 1: Japanese Patent Application Laid-Open No. 2003-340640

DISCLOSURE OF THE INVENTION

Technical Problem

This invention has been made in order to solve the foregoing problems. Accordingly, an object of the present invention is to provide: a method of holding a band saw blade by means of a band saw blade guide device capable of always keeping the clearance between a fixed insertion block and a movable insertion block at an appropriate clearance no matter how much a non-toothed section of the band saw blade varies in thickness from one type to another; and the band saw blade guide device.

Technical Solution

In order to achieve the above object, a first aspect of the present invention provides method of holding a band saw blade by means of a band saw blade guide device in a band saw machine, comprising the steps of in the process of holding a non-toothed section of the band saw blade between a fixed insertion block and a movable insertion block included in the band saw blade guide device, moving the movable insertion block while holding a return allowing unit in a returnable state, the return allowing unit including a pressing force transmitting member and a passive member, the pressing force transmitting member being pressed and moved by an actuator configured to move the movable insertion block toward the fixed insertion block, the passive member being passively moved by the movement of the pressing force transmitting member and being movable relative to the pressing force transmitting member; firmly holding the band saw blade between the fixed insertion block and the movable insertion block; fixing any one of the pressing force transmitting member and the passive member of the return allowing unit in an immovable state by use of a mechanical fixing unit; and returning the movable insertion block by a previously-set amount of return by a return allowing action of the return allowing unit in the fixed state, and thereby keeping a clearance between the fixed insertion block and the movable insertion block at an appropriate clearance corresponding to a thickness of the band saw blade.

A second aspect of the present invention dependent on the first aspect provides the method of holding a band saw blade by means of a band saw blade guide device, wherein the appropriate clearance is within a range of S/L of $1/1000$ to $1/1100$ where L denotes a width dimension of the band saw blade, and S denotes a value obtained by subtracting a thickness dimension of the band saw blade from a clearance dimension between the fixed insertion block and the movable insertion block.

A third aspect of the present invention provides a band saw blade guide device in a band saw machine, comprising: a main body block including a back portion supporting member configured to support and guide a back portion of a band saw blade, a fixed insertion block configured to hold and guide a non-toothed section of the band saw blade, and a movable insertion block provided opposed to the fixed insertion block; an actuator configured to move the movable block toward the fixed insertion block; an insertion block moving unit provided between the actuator and the movable block, and configured to move the movable insertion block in response to an operation of the actuator; and a return allowing unit included in the insertion block moving unit, and configured to allow the movable insertion block, firmly holding the band saw blade with the fixed insertion block, to return by a previously-set amount of return, wherein the return allowing unit includes a pressing force transmitting member and a passive member, the pressing force transmitting member being directly pressed by the actuator, the passive member being passively moved by the movement of the pressing force transmitting member, and being movable relative to the pressing force transmitting member, and the band saw blade guide device further comprises a mechanical fixing unit capable of fixing any one of the pressing force transmitting member and the passive member of the return allowing unit.

Advantageous Effects

In the present invention according to each of the first to third aspects, the insertion block moving unit configured to move the movable insertion block toward the fixed insertion block is included between the actuator configured to move the movable insertion block and the movable insertion block; this insertion block moving unit includes the return allowing unit configured to allow the return of the movable insertion block; and the mechanical fixing unit configured to mechanically fix this return allowing unit is included. Consequently, the movable insertion block is allowed to return always by a certain amount, and the clearance between the fixed insertion block and the movable insertion block can be kept at an appropriate clearance corresponding to the thickness of the band saw blade.

BRIEF DESCRIPTION OF THE DRAWINGS

FIGS. 2(A) and 2(B) are data on experiments which show a relationship between clearance dimensions and cutting deviation.

FIGS. 10(A), 10(B) and 10(C) are conceptual, schematic and explanatory diagrams of a band saw blade guide device according to a 7th embodiment.

FIGS. 20(A), 20(B) and 20 (C) are conceptual, schematic and explanatory diagrams of a band saw blade guide device according to a 15th embodiment.

BEST MODES FOR CARRYING OUT THE INVENTION

Descriptions will be hereinbelow provided for embodiments of the present invention by use of the drawings.

Figure 1:
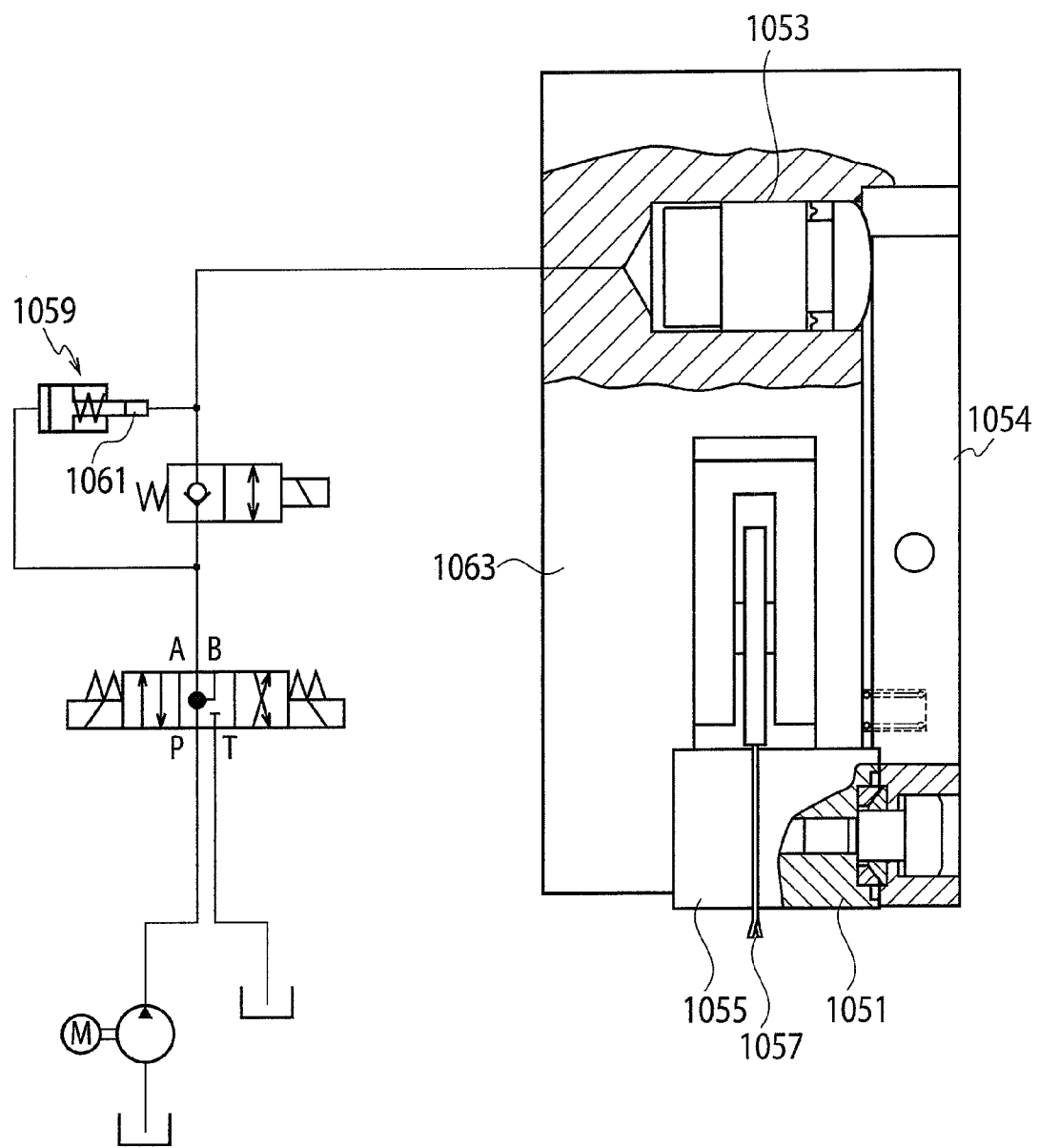
FIG. 1 is an explanatory diagram of a conventional band saw blade guide device.
Figure 3:
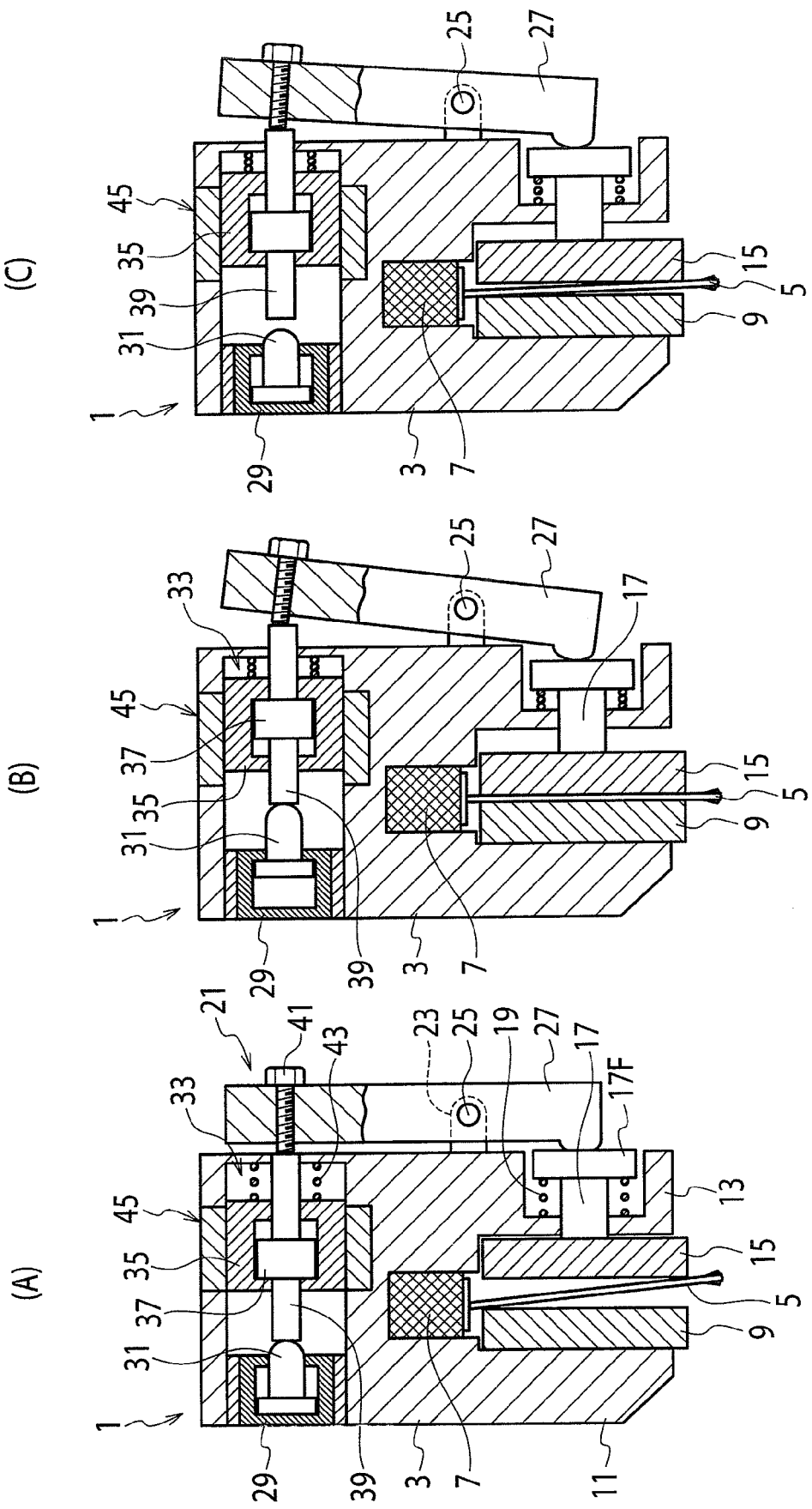
FIGS. 3(A), 3(B) and 3(C) are working explaining diagrams conceptually and schematically showing a configuration of a band saw blade guide device according to an embodiment of the present invention.

As conceptually and schematically shown in FIG. 3, a band saw blade guide device 1 according to this embodiment of the present invention includes a main body block 3; and like in a band saw blade guide device in general vertical and horizontal band saw machines, this main body block 3 includes an appropriate back portion supporting member 7, such as a roller or a block, configured to support and guide the back portion of a band saw blade 5. In addition, the main body block 3 integrally includes a fixed-side insertion arm 11 which integrally includes a fixed insertion block 9, configured to hold and guide the non-toothed section of the band saw blade 5, inside the fixed-side insertion arm 11.

Furthermore, the main body block 3 includes a movable-side insertion arm 13 which is opposed to the fixed-side insertion arm 11. Inside this movable-side insertion arm 13, a movable insertion block 15 configured to hold and guide the band saw blade 5 while opposed to the fixed insertion block 9 is provided movably in directions toward and away from the fixed insertion block 9. Incidentally, in this embodiment, the movable-side insertion atm 13 is integrally provided to the main body block 3. Instead, however, the movable-side insertion arm 13 may be provided movable (turnable) in directions toward and away from the fixed-side insertion arm 11, and fixable in a state of being close to the fixed-side insertion arm 11.

As a configuration for making the movable insertion block 15 movable in the directions toward and away from the fixed insertion block 9, the extremity portion of a slide rod 17 movably penetrating the movable-side insertion arm 13 is integrally connected to the movable insertion block 15. In addition, an elastic member 19, such as a coil spring, configured to bias the movable insertion block 15 in the direction toward and away from the fixed insertion block 9 is elastically installed between a flange portion 17F, which is provided to the base end portion of the slide rod 17, and the movable-side insertion arm 13.

Furthermore, the main body block 3 includes an insertion block pressing unit (insertion block moving unit) 21 configured to press and move the movable insertion block 15 toward the fixed insertion block 9. To put it more specifically, a swingable lever 27 is swingably (turnably) supported by a bracket 23, which is provided to the main body block 3, with the assistance of a pivot 25; and the extremity portion (lower end portion) of this swingable lever 27 is in contact with the flange portion 17F of the slide rod 17. Moreover, the main body block 3 includes a direct-drive actuator 29, such as a fluid-pressure cylinder, for the purpose of swinging the swingable lever 27. Besides, a return allowing unit 33 configured to allow a slight return of the movable insertion block 15 is provided between a reciprocating operation member 31, such as a piston rod, capable of reciprocating in this direct-drive actuator 29 and the upper portion of the swingable lever 27.

With the foregoing configuration, once the direct-drive actuator 29 is put into operation and the swingable lever 27 is turned clockwise in FIG. 3 with the assistance of the return allowing unit, the lower end portion of the swingable lever 27 presses the slide rod 17 against the biasing force of the elastic member 19. Accordingly, the movable insertion block 15 is moved toward the fixed insertion block 9, and the non-toothed section of the band saw blade 5 is firmly pressed between the fixed insertion block 9 and the movable insertion block 15.

When a workpiece (whose illustration is omitted) is cut with the band saw blade 5 firmly pressed between the fixed insertion block 9 and the movable insertion block 15 as described above, cutting deviation can be inhibited. However, a problem arises that the friction between the band saw blade 5 and each of the two insertion blocks 9, 15 is large, and that the insertion blocks 9, 15 wear down very much.

With this taken into consideration, the present embodiment takes measures to keep the clearance between the fixed insertion block 9 and the movable insertion block 15 at an appropriate clearance which is beforehand set corresponding to the thickness of the non-toothed section of the band saw blade 5 (a clearance dimension obtained by subtracting a thickness dimension of the band saw blade 5 from a clearance dimension between the fixed insertion block 9 and the movable insertion block 15). In other words, the return allowing unit 33 has a function of transmitting the pressing force of the actuator 29 to the swingable lever 27. In addition, as described above, the return allowing unit 33 has a function of allowing the slight return of the movable insertion block 15 after the band saw blade 5 is firmly pressed between (held between) the fixed insertion block 9 and the movable insertion block 15.

To put it more specifically, the return allowing unit 33 includes a tube-shaped hollow slider 35 which is movable in the leftward and rightward directions in FIG. 3. A slider 37, such as a piston, which is slightly movable in the leftward and rightward directions in FIG. 3, is provided inside this hollow slider 35. Moreover, this slider 37 is provided with a slide rod 39, such as a piston rod, which projects out from the two ends of the hollow slider 35. One end portion (the left end portion, in the drawing) of this slide rod 39 is capable of getting into contact with the extremity portion of the reciprocating operation member 31, and the other end portion of the slide rod 39 is capable of getting into contact with a contact member 41, such as an adjustable screw, which is provided to the swingable lever 27.

The main body block 3 includes an arbitrary elastic member 43, such as a plate spring or a coil spring, in order to always press and bias the hollow slider 35, which is movably provided to the main body block 33, toward the actuator 29. In addition, the main body block 33 includes a mechanical fixing unit 45 capable of fixing the whole of the insertion block moving unit (insertion block pressing unit) 21, including the return allowing unit 33, in an immovable state.

Figure 4:
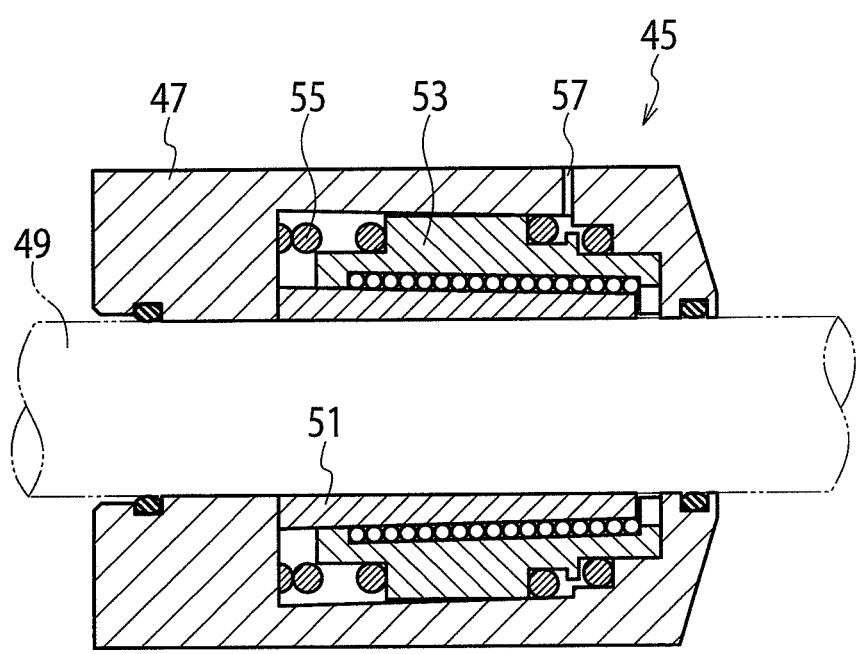
FIG. 4 is an explanatory diagram showing a configuration of a mechanical fixing unit.

Although the configuration of the mechanical fixing unit 45 is publicly known, let us explain its configuration as shown in FIG. 4 to make sure of it. The mechanical fixing unit 45 includes a tube-shaped stationary main body 47. A collet 51 capable of being fastening a movable body 49 such as a rod is provided inside this stationary main body 47. Furthermore, a tube-shaped piston 53 whose inner peripheral surface is a taper surface fitting to the taper surface in the outer peripheral surface of the collet 51 is provided capable of moving in the thrust direction in order to increase or decrease the diameter of the collet 51. A return spring 55 configured to return the piston 53 to its original position is installed between the piston 53 and the stationary main body 47.

For this reason, once a working fluid is supplied to the inside of the stationary main body 47 through an inlet port 57 and the piston 53 moves in the leftward direction against the biasing force of the return spring 55, the diameter of the collet 51 decreases, and the collet 51 accordingly fastens and fixes the movable body 49 inside the collet 51. Thereafter, once the working fluid is discharged, the piston 53 returns to its initial position due to the action of the return spring 55, and the movable body 49 is accordingly released from the collet 51 fastening the movable 49, thus becoming movable.

In the foregoing configuration, while the clearance between the fixed insertion block 9 and the movable insertion block 15 is in a widely opened state with the movable insertion block 15 being largely far from the fixed insertion block 9, the non-toothed section of the band saw blade 5 is arranged between the fixed insertion block 9 and the movable insertion block 15, and the back portion of the band saw blade 5 is brought into contact with the back portion supporting member 7.

After that, once the actuator 29 is put into operation and the reciprocating operation member 31 is moved in the rightward direction in FIG. 3(A), the swingable lever 27 is turned clockwise with the assistance of the slide rod 39 in the return allowing unit 33, and thus moves the slide rod 17 and the movable insertion block 15 toward the fixed insertion block 9. Subsequently, once the right end portion of the slider 37 in the return allowing unit 33 gets into contact with the hollow slider 35, the hollow slider 35 is integrally moved against the biasing force of the elastic member 43. Hence, the band saw blade 5 is firmly pressed between (held between) the fixed insertion block 9 and the movable insertion block 15.

As described above, when the band saw blade 5 is firmly pressed between the fixed insertion block 9 and the movable insertion block 15, the mechanical fixing unit 45 fixes the hollow slider 35 to the main body block 3 in the immovable state (see FIG. 3(B)). Thereafter, once the actuator 29 is returned to the initial state, the insertion block pressing unit (insertion block moving unit) 21, the slide rod 39 in the return allowing unit 33, and the like are slightly returned due to the action of the elastic member 19 within the movable range of the slider 37 inside the hollow slider 35.

Accordingly, the movable insertion block 15 is returned slightly (for example, by approximately 0.05 mm) in the direction in which the firmly pressed state of the band saw blade 5 becomes loose. As a result, the clearance between the fixed insertion block 9 and the movable insertion block 15 is kept at a clearance of an appropriate value which corresponds to the thickness of the band saw blade 5.

As understood from the foregoing explanation, the slide rod 39 is a pressing force transmitting member configured to transmit the pressing force of the actuator 29 to the swingable lever 27 by being directly pressed and moved by the actuator 29. In addition, the hollow slider 35 is a passive member configured to be passively moved integrally with the slider 37, which is provided to the slide rod 39 as the pressing force transmitting member, once the slider 37 get into contact with the hollow slider 35. This hollow slider 35 as the passive member is provided capable of moving relative to the pressing force transmitting member (the slider 37).

The clearance between the fixed insertion block 9 and the movable insertion block 15 is beforehand set on the basis of the amount at which the hollow slider 35 is movable relative to the slider 37 in the return allowing unit 33. The return allowing unit 33 is configured to allow a slight return of the movable insertion block 15 while fixed to the main body block 3 in the immovable state by the mechanical fixing unit 45. Because the return allowing unit 33 is detached from the actuator 29, the return of the actuator 29 needs not be controlled or adjusted. In other words, the return action of the return allowing unit 33 is performed independently of the actuator 29; and the adjusted clearance between the fixed insertion block 9 and the movable insertion block 15 will never become larger even if the operational system of the actuator 29 malfunctions, because the return allowing unit 33 and the actuator 29 are kept detached from each other.

The hollow slider 35 is mechanically fixed there. In addition, the return of the movable insertion block 15 is mechanically performed due to the accumulated force of the elastic member 19. For these reasons, no fluid pressure mechanism is included in the pressing force transmitting system from the slide rod 39 through the movable insertion block 15. The return action is a mechanical action, and is accordingly smooth. In addition, once an adjustment is made for the appropriate clearance, the clearance is kept at the stable state.

It should be noted that the configuration of the mechanical fixing unit 45 is not limited to the foregoing configuration. For example, a configuration may be employed in which the hollow slider 35 is pressed against and fixed to the main body block 3 by a piston rod of a single-acting cylinder. Otherwise, a configuration may be employed in which the hollow slider 35 is clamped and fixed to the main body block 3 by the extremity portion of a clamping screw. In other words, the mechanical fixing unit configured to mechanically fix the return allowing unit 33 can be realized as various modified modes.

Figure 5:
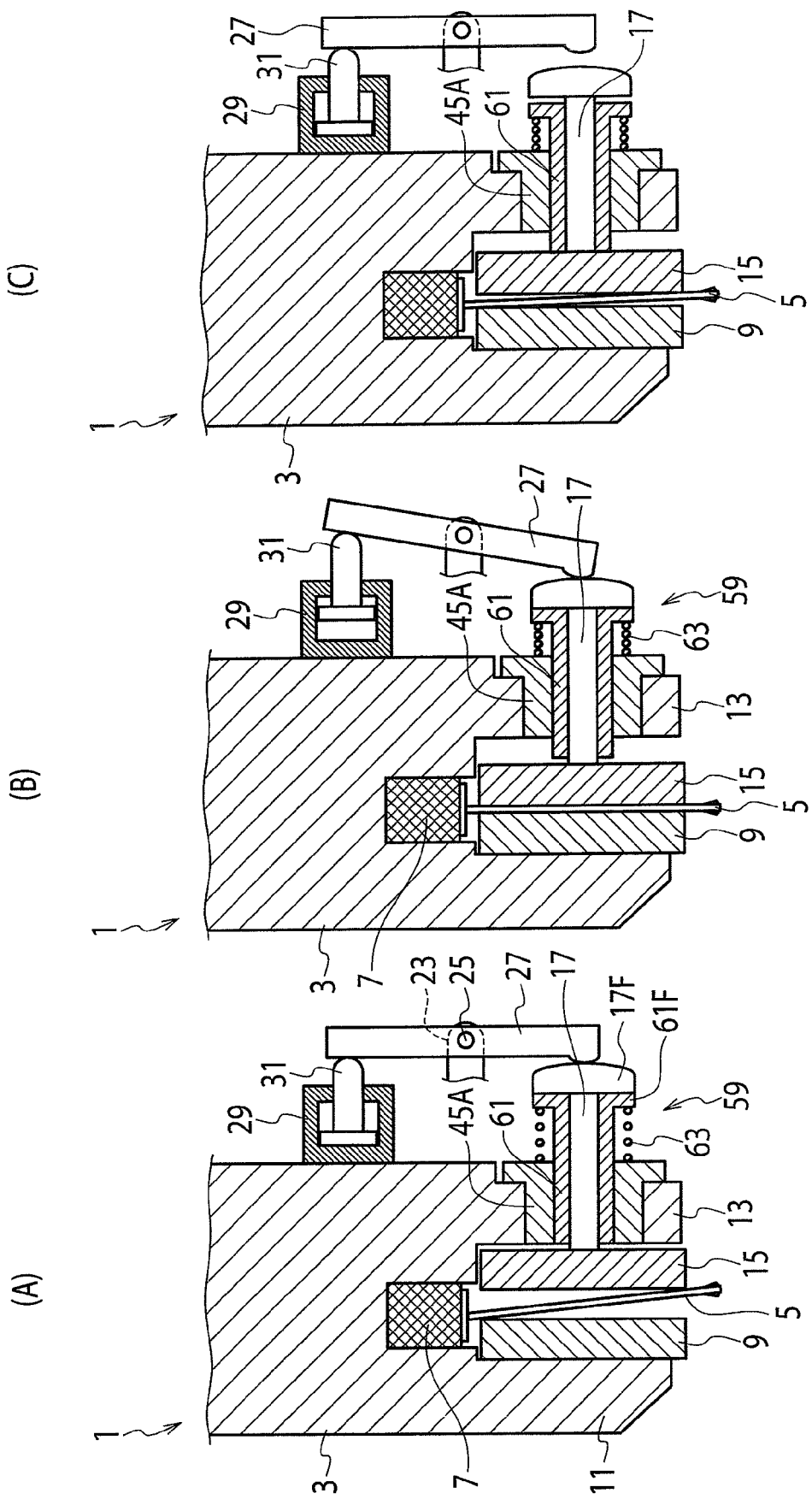
FIGS. 5(A), 5(B) and 5(C) are conceptual, schematic and explanatory diagrams of a band saw blade guide device according to a second embodiment.

FIG. 5 shows a band saw blade guide device 1 according to a second embodiment of the present invention. Components which carry out the same functions as do those of the first embodiment above-described will be denoted by the same reference numerals, and duplicated descriptions for such components will be omitted.

In the second embodiment, a return allowing unit 59 is made in a portion of the slide rod 17 configured to press the movable insertion block 15 toward the fixed insertion block 9.

To put it more specifically, a mechanically fixing unit 45A is provided to the movable-side insertion arm 13 in the main body block 3. Incidentally, because the constitution of this mechanical fixing unit 45A is the same as that of the mechanical fixing unit 45, the descriptions for the mechanical fixing unit 45A will be omitted. A lock collar 61 is supported by this mechanically fixing unit 45A in a movable manner, and in a manner fixable to the mechanically fixing unit 45A in an immovable state. In addition, an elastic member 63 such as a coil spring is elastically installed between a flange portion 61F of this lock collar 61 and the mechanically fixing 45A.

The slide rod 17 slidably penetrates the inside of the lock collar 61. This slide rod 17 is designed such that the extremity portion of the slide rod 17 project out from the extremity portion of the lock collar 61 slightly, for example by approximately 0.05 mm, while the flange portion 17F of the slide rod 17 and the flange portion 61F of the lock collar 61 are in contact with each other.

In other words, the foregoing configuration includes: the slide rod 17 as a pressing force transmitting member to be indirectly pressed by the actuator 29; and the lock collar 61 as a passive member to be passively moved in conjunction with the movement of this slide rod 17.

In the foregoing configuration, as shown in FIG. 5(A), the band saw blade 5 is arranged between the fixed insertion block 9 and the movable insertion block 15. Thereafter, once the swingable lever 27 is turned (swung) clockwise by putting the actuator 29 into operation, the slide rod 17 and the lock collar 61 are integrally moved in the leftward direction in FIG. 5(A) against the biasing force of the elastic member 63. In other words, the movable insertion block 15 is moved toward the fixed insertion block 9, and the band saw blade 5 is firmly pressed by and held between the fixed insertion block 9 and the movable insertion block 15 (see FIG. 5(B)).

While the band saw blade 5 is firmly pressed between the fixed insertion block 9 and the movable insertion block 15 as described above, the lock collar 61 is fixed in the immovable state by putting the mechanically fixing unit 45A into operation. After that, once the actuator 29 is put out of operation, the clearance between the fixed insertion block 15 and the movable insertion block 15 is expanded slightly (for example, by approximately 0.05 mm), to bring the movable insertion block 15 into contact with the extremity portion of the lock collar 61. Thus, the band saw blade 5 is released from being firmly held between (pressed between) the fixed insertion block 9 and the movable insertion block 15 (see FIG. 5(C)).

For this reason, in the second embodiment, too, the clearance between the fixed insertion block 9 and the movable insertion block 15 can be kept at an appropriate clearance corresponding to the thickness of the band saw blade 5. In addition, the return allowing unit 59 and the actuator 29 are detached from each other during the return allowing operation of the return allowing unit 59 and during the operation of keeping the clearance at the appropriate clearance. Furthermore, like in the previously-described embodiment, no fluid pressure mechanism is included in the second embodiment. Accordingly, the second embodiment can bring about the same effects as can the first embodiment.

Figure 6:
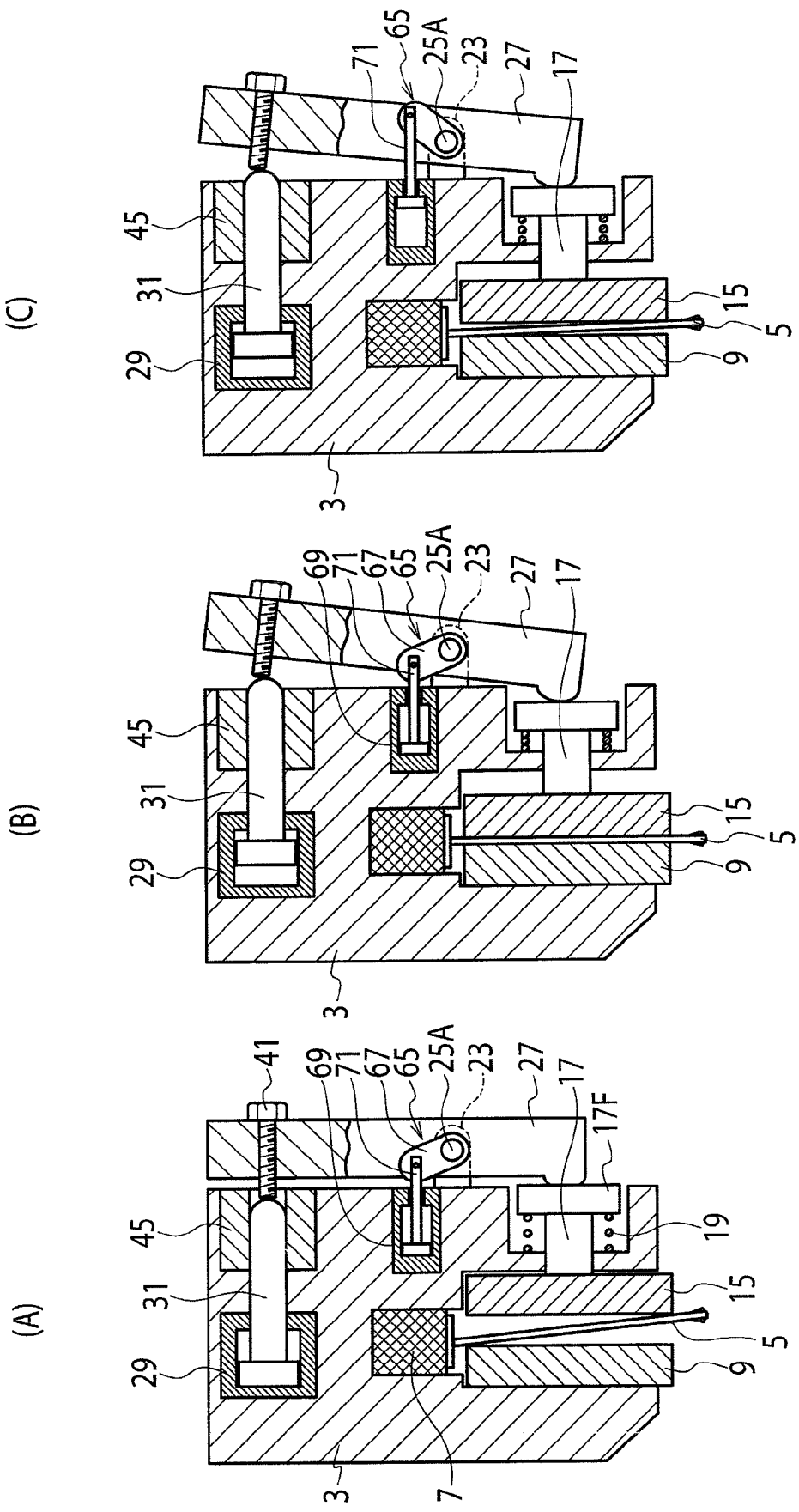
FIGS. 6(A), 6(B) and 6(C) are conceptual, schematic and explanatory diagrams of a band saw blade guide device according to a third embodiment.

FIG. 6 shows a third embodiment of the present invention. Components which carry out the same functions as do those of the foregoing embodiments will be denoted by the same reference numerals, and duplicated descriptions for such components will be omitted.

In the third embodiment, a return allowing unit 65 is provided to a part of the pivot 25. To put it more specifically, the reciprocating operation member 31 in the actuator 29 is designed to be fixable in an immovable state by the mechanical fixing unit 45. In addition, an eccentric portion is formed in a portion of a pivot 25A corresponding to the pivot 25, which fits in the swingable lever 27. For this reason, once the pivot 25A is turned, a portion of the swingable lever 27 which is supported by the pivot 25A moves very slightly in the directions toward and away from the main body block 3, in conjunction with the turn of the eccentric portion (the leftward and rightward directions in FIG. 6).

A lever 67 is attached to the pivot 25A in order to turn the pivot 25A. The extremity portion of a reciprocating operation member 71, such as a piston rod, in a reciprocating actuator 69, such as a fluid cylinder, which is provided to the main body block 3 is interlocked with and connected to the extremity portion of the lever 67.

In the foregoing configuration, once the swingable lever 27 is turned clockwise in FIG. 6(A) by putting the actuator 29 into operation while the band saw blade 5 is arranged between the fixed insertion block 9 and the movable insertion block 15, the band saw blade 5 is firmly pressed between the fixed insertion block 9 and the movable insertion block 15. While the band saw blade 5 is in this state, the reciprocating operation member 31 is fixed in the immovable state by the mechanical fixing unit 45.

Once the pivot 25A is turned by putting the actuator 69 into operation with the upper portion of the swingable lever 27 pressed by the reciprocating operation member 31 as described above, the position of the eccentric portion of the pivot 25A is slightly moved in the direction away from the main body block 3. For this reason, the swingable lever 27 slightly turns counterclockwise about the portion of the swingable lever 27 which is pressed by the reciprocating operation member 31 in FIG. 6(B). As a result, the lower end portion of the swingable lever 27 moves slightly (for example, by approximately 0.05 mm) in the direction in which the slide rod 17 is released from being pressed by the lower end portion of the swingable lever 27. Accordingly, the clearance between the fixed insertion block 9 and the movable insertion block 15 becomes equal to the appropriate clearance corresponding to the thickness of the band saw blade 5. In other words, the third embodiment can bring about the same effects as can the foregoing embodiments.

Figure 7:
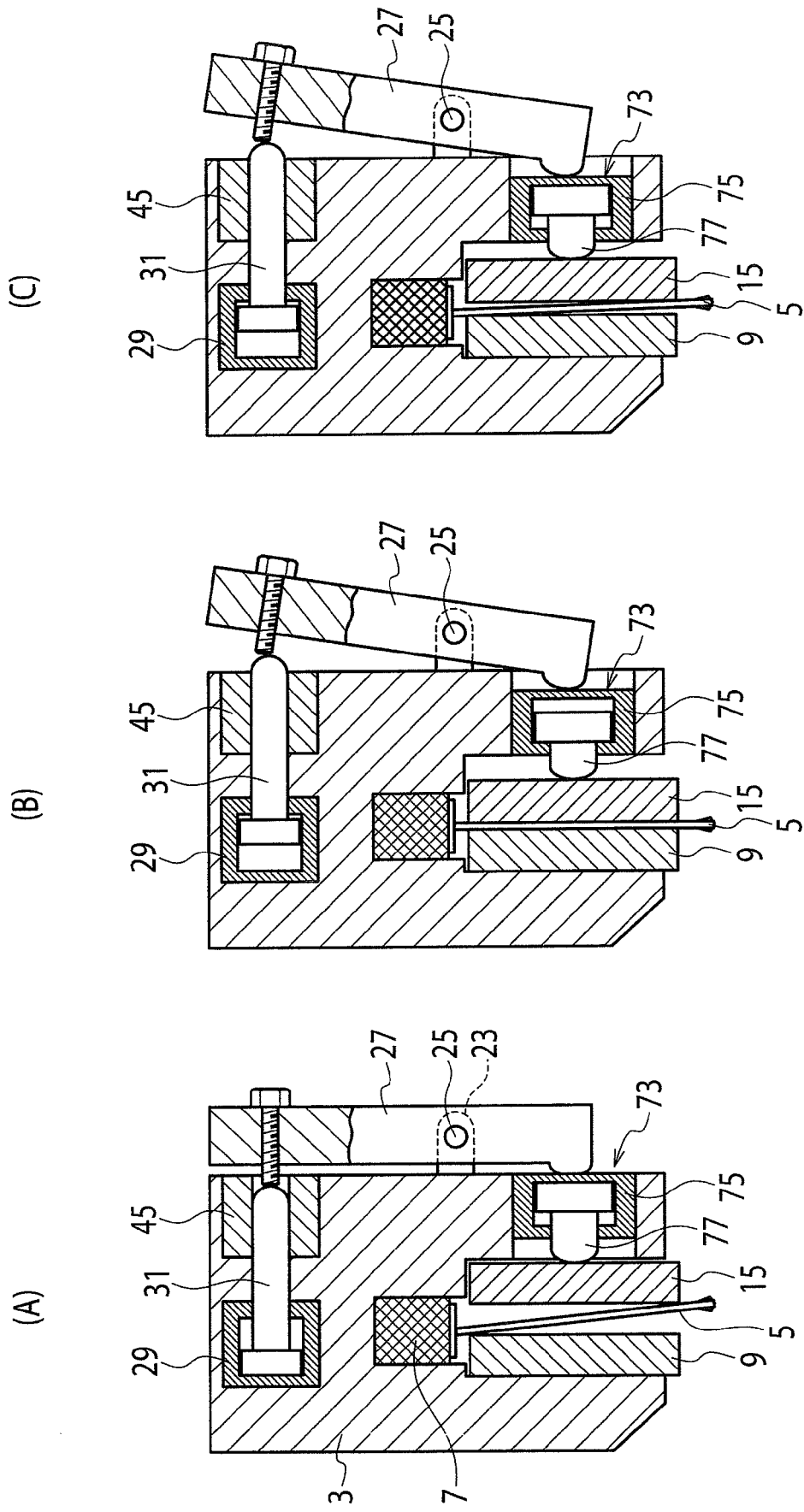
FIGS. 7(A), 7(B) and 7(C) are conceptual, schematic and explanatory diagrams of a band saw blade guide device according to a fourth embodiment.

FIG. 7 shows a fourth embodiment of the present invention. Components which bring about the same effects as do those of the foregoing embodiments will be denoted by the same reference numerals, and duplicated descriptions will be omitted.

In the fourth embodiment, a return allowing unit 73 is provided in the place corresponding to the slide rod 17, like in the second embodiment. To put it more specifically, the configuration of the return allowing unit 73 is that obtained by movably providing a small fluid pressure cylinder 75, instead of the slide rod 17, to the main body block 3. Thus, the movable insertion block 15 is designed to be pressed by a pressing operation member 77, such as a piston rod, which is provided to this fluid pressure cylinder 75 movably by reciprocating.

In this configuration, as shown in FIG. 7(A), the band saw blade 5 is arranged in the clearance between the fixed insertion block 9 and the movable insertion block 15 when the clearance is in a widely opened state with the pressing operation member 77 of the return allowing unit 73 moved in the rightward direction with respect to the fluid pressure cylinder 75 (in the direction away from the fixed insertion block 9).

Thereafter, the pressing operation member 77 is moved slightly (for example, by approximately 0.05 mm) toward the fixed insertion block 9 with respect to the fluid pressure cylinder 75, and concurrently, the to swingable lever 27 is turned clockwise in FIG. 7(A) by putting the actuator 29 into operation. Once the swingable lever 27 is turned as described above, the movable insertion block 15 is moved toward the fixed insertion block 9 with the assistance of the fluid pressure cylinder 75, and the band saw blade 5 is firmly pressed between the movable insertion block 15 and the fixed insertion block 9.

While the band saw blade 5 is firmly held between the fixed insertion block 9 and the movable insertion block 15 as described above, the mechanical fixing unit 45 is put into operation, and the reciprocating operation member 31 of the actuator 29 is fixed in an immovable state (see FIG. 7(B)). After that, once the working fluid is discharged from the inside of the fluid pressure cylinder 75 in the return allowing unit 73, the pressing operation member 77 moves slightly in the rightward direction in FIG. 7(B) with respect to the fluid pressure cylinder 75. Thus, the band saw blade 5 is released from being firmly pressed between (held between) the fixed insertion block 9 and the movable insertion block 15. Accordingly, the clearance between the fixed insertion block 9 and the movable insertion block 15 is kept at the appropriate clearance corresponding to the thickness of the band saw blade 5.

In sum, this embodiment also brings about the same effects as do the foregoing embodiments. Incidentally, the foregoing descriptions have been provided for the scheme in which: the fluid pressure cylinder 75 is pressed by the swingable lever 27; and the movable insertion block 15 is pressed by the pressing operation member 77. However, the pressing of the movable insertion block 15 by the pressing operation member 77 and the pressing of the movable insertion block 15 by the fluid pressure cylinder 75 are relative matters. In other words, the direction of the fluid pressure cylinder 75 may be reversed to the direction in which the fluid pressure 75 is set in the state shown in FIG. 7. Note that if the direction of the fluid pressure cylinder 75 is thus revered, it is the pressing operation member 77 that be pressed by the swingable lever 27.

Figure 8:
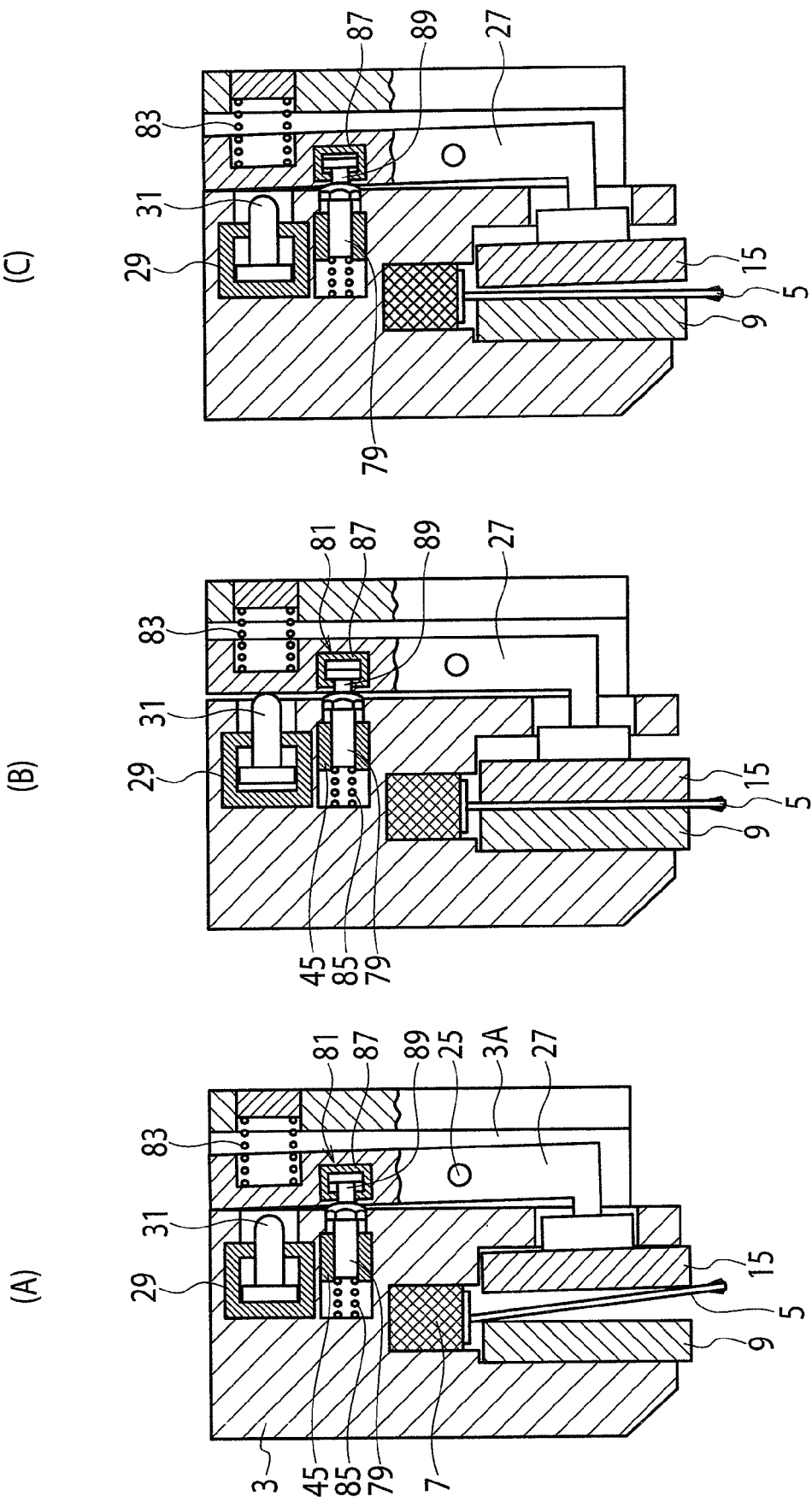
FIGS. 8(A), 8(B) and 8(C) are conceptual, schematic and explanatory diagrams of a band saw blade guide device according to a fifth embodiment.

FIG. 8 shows a configuration of a band saw blade guide device according to a fifth embodiment of the present invention. Components which carry out the same functions as do those of the foregoing embodiments will be denoted by the same reference numerals, and duplicated descriptions for such components will be omitted.

In the fifth embodiment, an auxiliary rod 79 movable in a direction parallel to the direction in which the reciprocating operation member 31 of the actuator 29 moves is provided to the main body block 3, and a return allowing unit 81 is provided between this auxiliary rod 79 and the swingable lever 27. To put it specifically, the swingable lever 27 is swingably arranged inside a recessed portion 3A provided in the main body block 3, and an elastic member 83, such as a coil spring, which is configured to bias the swingable lever 27 counterclockwise in FIG. 8(A) is elastically installed between the swingable lever 27 and the main body block 3.

In addition, the main body block 3 includes the auxiliary rod 79 movable in the same direction as the reciprocating operation member 31 of the actuator 29 moves, and this auxiliary rod 79 is biased toward the swingable lever 27 by a built-in elastic member 85. Incidentally, the biasing force of the elastic member 85 is so small that the elastic member 85 cannot turn the swingable lever 27 clockwise against the biasing force of the elastic member 83. Furthermore, the main body block 3 includes the mechanical fixing unit 45 capable of fixing the auxiliary rod 79 in an immovable state.

The swingable lever 27 includes a fluid pressure cylinder 87, corresponding to the auxiliary rod 79. An extremity portion of a reciprocating operation member 89, such as a piston rod, which is provided to this fluid pressure cylinder 87 in a way capable of reciprocating, is in contact with the extremity portion of the auxiliary rod 79.

In the foregoing configuration, the band saw blade 5 is arranged in the clearance between the fixed insertion block 9 and the movable insertion block 15 while the clearance is set in the widely opened state by turning the swingable lever 27 counterclockwise by the biasing force of the elastic member 83; and by making the reciprocating operation member 89 contract inside the fluid pressure cylinder 87 as shown in FIG. 8(A). In addition, once the swingable lever 27 is turned clockwise in FIG. 8(A) by putting the actuator 29 into operation while the reciprocating operation member 89 is in the state projecting and extending from the fluid pressure cylinder 87, the auxiliary rod 79 moves in the rightward direction in FIG. 8(A) while following the clockwise movement of the fluid pressure cylinder 87 and the reciprocating operation member 89. Furthermore, the band saw blade 5 is firmly held between the fixed insertion block 9 and the movable insertion block 15 (see FIG. 8(B)).

Thereafter, the auxiliary rod 79 is fixed in the immovable state by putting the mechanical fixing unit 45 into operation, and the actuator 29 is returned to the initial state. Afterward, once the working fluid is discharged from the fluid pressure cylinder 87 in the return allowing unit 81, the swingable lever 27 is slightly turned counterclockwise in FIG. 8(B) due to the biasing force of the elastic member 83. Thus, the band saw blade 5 is released from being firmly pressed between the fixed insertion block 9 and the moveable insertion block 15, and the clearance between the fixed insertion block 9 and the movable insertion block 15 is adjusted at the appropriate clearance corresponding to the thickness of the band saw blade 5. Accordingly, this embodiment can also bring about the same effects as can the foregoing embodiments.

Figure 9:
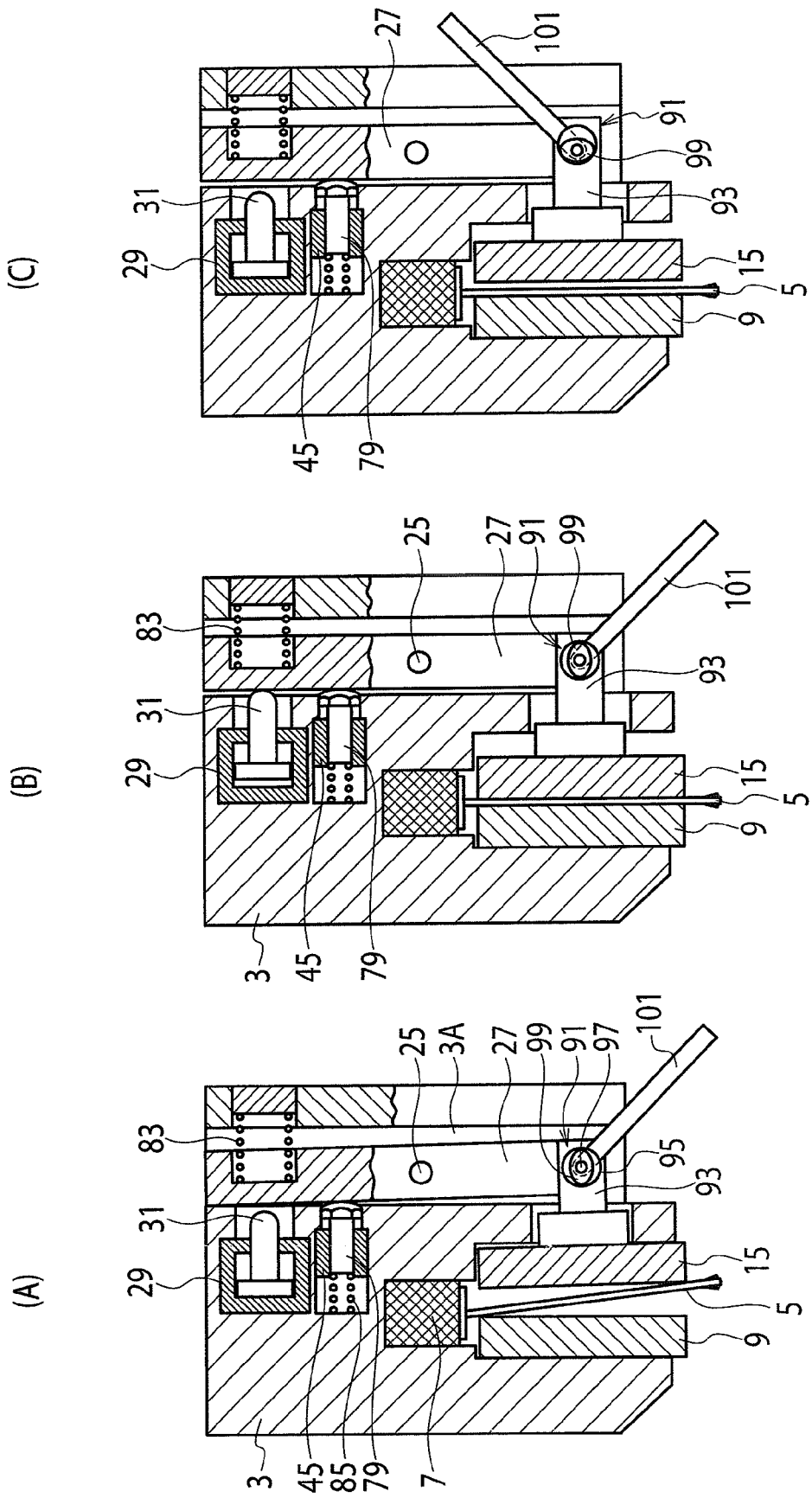
FIGS. 9(A), 9(B) and 9(C) are conceptual, schematic and explanatory diagrams of a band saw blade guide device according to a 6th embodiment.

FIG. 9 shows a band saw blade guide device according to a 6th embodiment of the present invention. Components which bring about the same effects as do those of the foregoing embodiments will be denoted by the same reference numerals, and duplicated descriptions for such components will be omitted.

The 6th embodiment corresponds to a modification of the fifth embodiment described above. A return allowing unit 91 is provided to a connecting portion between the movable insertion block 15 and the swingable lever 27. To put it more specifically, a protruding bracket 93 integrally provided to the movable insertion block 15 is movably attached to the lower end portion of the swingable lever 27. In addition, as a configuration for moving the protruding bracket 93 with respect to the swingable lever 27, a circular through-hole 95 is formed in the protruding bracket 93. An elliptical (oval) cam 99 integrally provided to a camshaft 97, which is rotatably supported by the swingable lever 27, is fitted into this through-hole 95. The camshaft 97 includes an operation lever 101 configured to rotationally operate the camshaft 97.

In the foregoing configuration, the band saw blade 5 is arranged in the clearance between the fixed insertion block 9 and the movable insertion block 15 while: the long axis of the cam 99 in the return allowing unit 91 is almost parallel to the longitudinal direction of the protruding bracket 93; the cam 99 is in contact with a portion of the inner peripheral surface of the through-hole 95 which is closer to the movable insertion block 15; and the clearance is in the widely opened state (see FIG. 9(A)). Thereafter, the swingable lever 27 is turned clockwise in FIG. 9(A) by putting the actuator 29 into operation, and the band saw blade 5 is accordingly firmly held between the fixed insertion block 9 and the movable insertion block 15.

In this event, the pressing operation member 79 moves in the rightward direction in FIG. 9(A) while following the turn of the swingable lever 27. The auxiliary rod 79 is fixed in the immovable state by the mechanical fixing unit 45 while the band saw blade 5 is firmly held between the fixed insertion block 9 and the movable insertion block 15 with the pressing operation member 79 moved in the rightward direction as described above. Thereafter, once the cam 99 is turned so as for the short axis of the cam 99 to become almost parallel to the longitudinal direction of the protruding bracket 93 by rotationally operating the operation lever 101, the movable insertion block 15 moves by the difference between the long and short axes of the cam 99 (for example, by approximately 0.05 mm) in the direction away from the fixed insertion block 9 (see FIG. 9(C)).

As a result, the band saw blade 5 is released from being firmly held between the fixed insertion block 9 and the movable insertion block 15, and the clearance between the fixed insertion block 9 and the movable insertion block 15 is kept at the appropriate clearance corresponding to the thickness of the band saw blade 5. Accordingly, this embodiment can bring about the same effects as can the foregoing embodiment.

FIG. 10 shows a band saw blade guide device according to a 7th embodiment of the present invention. Components which carry out the same functions as do those of the foregoing embodiments will be denoted by the same reference numerals, and duplicated descriptions for such components will be omitted.

The configuration of the 7th embodiment is that in which: the movable insertion block 15 is moved with the assistance of a rack, a pinion and a screw mechanism; and the return allowing unit is provided to the part corresponding to the rack and pinion. To put it specifically, a pinion casing 103 is integrally provided to the side surface of the movable-side insertion arm 13 in the main body block 3, and a pinion 105 is provided inside the pinion casing 103 in a manner slightly rotatable and movable (for example, by approximately 0.05 mm) in the axial direction (in the leftward and rightward directions in FIG. 10). In other words, the configuration in which the pinion 105 is movable in the axial direction constitutes the return allowing unit. In addition, a bolt 107 is coaxially provided to this pinion 105. This bolt 107 is integrally provided to the movable insertion block 15, and is screwed to a nut 109 which is supported by the movable-side insertion arm 13 in the main body block 3 movably in the leftward and rightward directions in FIG. 10.

For this reason, once the pinion 105 is forwardly and reversely rotated in its home position, the movable insertion block 15 is moved in the directions toward and away from the fixed insertion block 9, respectively, due to the screw relationship between the bolt 107 and the nut 109. Incidentally, because the relationship between the nut 109 and the bolt 107 is a relative matter, a configuration may be employed in which: the nut 109 is provided to the pinion 105; and the bolt 107 is provided to the movable insertion block 15.

For the purpose of rotating the pinion 105, a rack 111 screwed to this pinion 105 is provided to be capable of reciprocating in the upward and downward directions. Concurrently, for the purpose of reciprocating the rack 111, an actuator 113, such as a fluid pressure cylinder, is provided to the side surface of the main body block 3. In addition, as the mechanical fixing unit configured to move the pinion 105 in the axial direction and fix the pinion 105 in the immovable state, a lock cylinder 115 is provided to the pinion casing 103.

To put it specifically, the lock cylinder 115 is provided coaxially with the pinion 105. The extremity portion of a piston rod 117 capable of reciprocating in this lock cylinder 115 is fitted into a recessed portion 105A formed in the pinion 105. Furthermore, a flange portion 117F capable of being locked to an inner flange 105F in the entrance/exit portion of the recessed portion 105A is provided to the extremity portion of the piston rod 117.

In the foregoing configuration, as shown in FIG. 10(A), the band saw blade 5 is arranged in the clearance between the fixed insertion block 9 and the movable insertion block 15 while: the bolt 107 is deeply screwed to the nut 109; and the clearance is in the widely opened state. Thereafter, the rack 111 is operated by the actuator 113; thus, the pinion 105 and the bolt 107 are rotated; and thereby, the movable insertion block 15 is moved toward the fixed insertion block 9. In this event, the pinion 105 tends to move in the rightward direction in FIG. 10(A) due to the reaction force. For this reason, the working fluid is supplied to the inside of the lock cylinder 115, and thereby, the piston rod 117 is operated and projected out. Accordingly, the flange portion 117F provided in the extremity portion of the piston rod 117 gets into contact with the farthest wall of the recessed portion 105A in the pinion 105. This makes it possible to prevent the rightward movement of the pinion 105.

Once the movable insertion block 15 is moved toward the fixed insertion block 9 by rotating the pinion 105 and the bolt 107 as described above, the band saw blade 5 is firmly held between the fixed insertion block 9 and the movable insertion block 15 (see FIG. 10(B)). Once the piston rod 117 in the lock cylinder 115 is operated and retracted after the band saw blade 5 is firmly held between the fixed insertion block 9 and the movable insertion block 15 as described above, the flange portion 117F of the piston rod 117 gets into contact with the inner flange 105F of the pinion 105, and thereby, the pinion 105 is moved slightly in the rightward direction in FIG. 10(B). Afterward, once the pinion 105 gets into contact with the pinion casing 103, the pinion 105 is pressed between the flange portion 117F and the pinion casing 103 in the immovable state, and is thus fixed there.

Once the pinion 105 is moved in the rightward direction as described above, the movable insertion block 15 is integrally moved with the assistance of the bolt 107 and the nut 109. Accordingly, the band saw blade 5 is released from being firmly held between the fixed insertion block 9 and the movable insertion block 15, and the clearance between the fixed insertion block 9 and the movable insertion block 15 becomes equal to the appropriate clearance corresponding to the thickness of the band saw blade 5. As a result, this embodiment obtains the same effects as do the foregoing embodiments.

Figure 11:
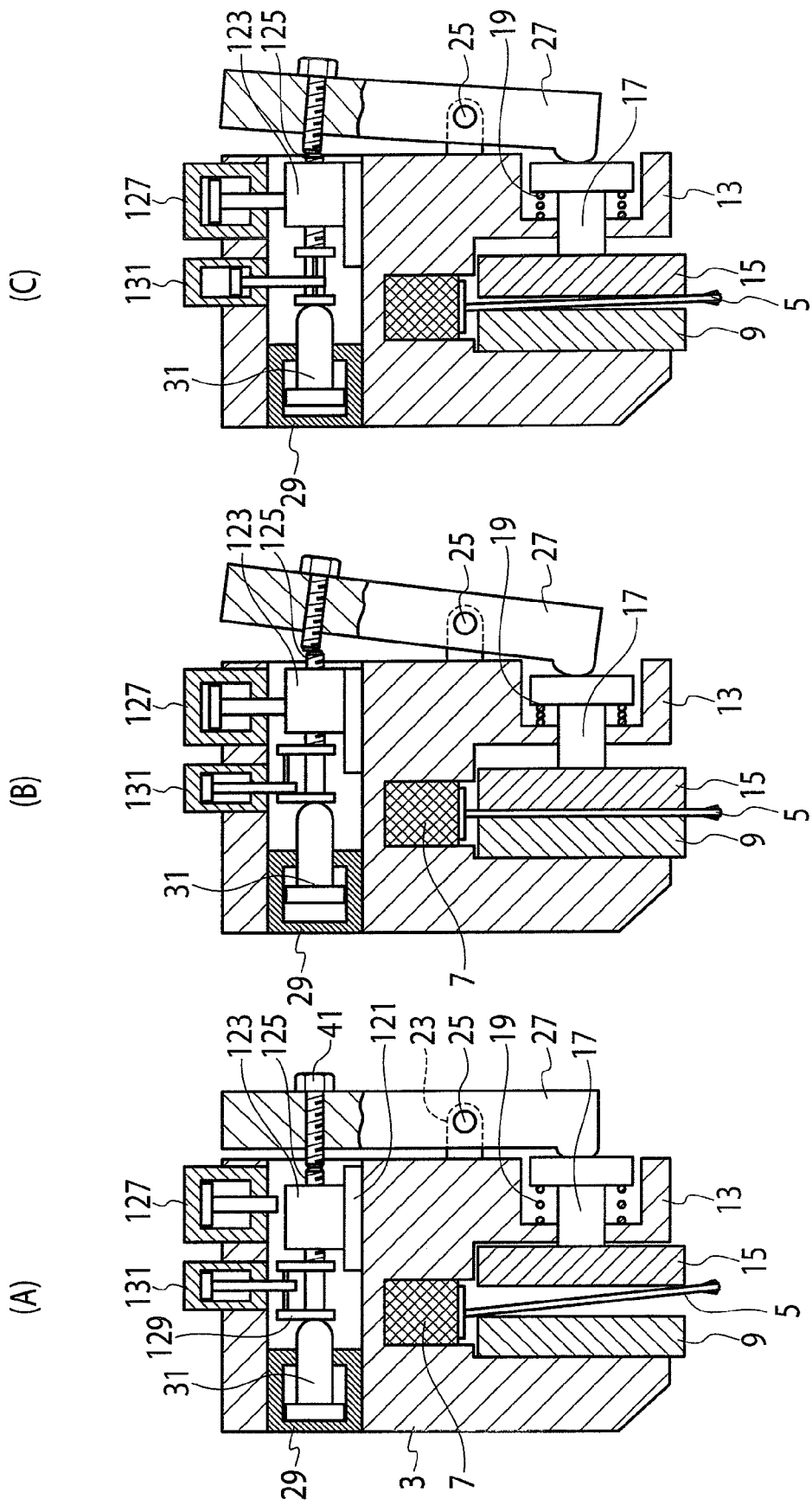
FIGS. 11(A), 11(B) and 11(C) are conceptual, schematic and explanatory diagrams of a band saw blade guide device according to an 8th embodiment.

FIG. 11 shows a band saw blade guide device according to an 8th embodiment of the present invention. Components which carry out the same functions as do those of the foregoing embodiments will be denoted by the same reference numerals, and duplicated descriptions for such components will be omitted. The configuration of the 8th embodiment is that in which: a screw mechanism is employed for the constitution for swinging the swingable lever 27; and a return allowing unit is provided to a part of this screw mechanism.

To put it more specifically, a nut member 123 is provided to a guide member 121, which is provided to the main body block 3, movably in the leftward and rightward directions in the drawing. In addition, a pressable screw member 125, whose extremity portion is in contact with the contact member 41 provided to the swingable lever 27, is screwed to the nut member 123 movably in the leftward and rightward directions in FIG. 11. Furthermore, the rear end portion of the screw member 125 is opposed to the reciprocating operation member 31 of the actuator 29. For this reason, the screw member 125 can be pressed in the rightward direction in FIG. 11 by the reciprocating operation member 31 of the actuator 29.

The main body block 3 includes a lock cylinder 127, as a mechanical fixing unit, which is capable of pressing the nut member 123 and fixing it in an immovable state. The main body block 3 is further provided with a screw rotating actuator 131, such as a fluid pressure cylinder, which is configured to rotate the screw member 125 by pushing and pulling a lever 129 provided to the screw member 125.

In the foregoing configuration, as shown in FIG. 11(A), the band saw blade 5 is arranged in the clearance between the fixed insertion block 9 and the movable insertion block 15 while the clearance is in the widely opened state. Thereafter, the swingable lever 27 is pressed with the assistance of the screw member 125 by putting the actuator 29 into operation, and the swingable lever 27 is thus turned clockwise in FIG. 11(A). Thereby, the band saw blade 5 is firmly held between the movable insertion block 15 and the fixed insertion block 9 (see FIG. 11(B)).

While the band saw blade 5 is firmly held as described above, the nut member 123 is pressed against and fixed to the guide member 121 by putting the lock cylinder 127 into operation. Thereafter, once the screw member 125 is rotated counterclockwise (or clockwise) by putting the screw rotating actuator 131 into operation, the screw member 125 moves slightly in the leftward direction in FIG. 11(B) with respect to the nut member 123. Accordingly, the return of the swingable lever 27 is allowed, and the swingable lever 27 returns while turning slightly counterclockwise as shown in FIG. 11(C).

As a result, the movable insertion block 15 moves slightly (for example, by approximately 0.05 m) in the direction toward and away from the fixed insertion block 9, and the band saw blade 5 is released from being firmly held between (pressed between) the fixed insertion block 9 and the movable insertion block 15. Thus, the clearance between the fixed insertion block 9 and the movable insertion block 15 is adjusted at the appropriate clearance corresponding to the thickness of the band saw blade 5. For this reason, this embodiment obtains the same effects as do the foregoing embodiments.

In this respect, let us examine the appropriate clearance which is a clearance dimension obtained by subtracting the thickness dimension of the band saw blade 5 from the clearance dimension between the fixed insertion block 9 and the movable insertion block 15. In a case where the band saw blade 5 is a general band saw blade whose width dimension is 54 mm, if the appropriate clearance is 0.05 mm, the band saw blade 5 is likely to tilt within the range of the appropriate clearance of 0.05 mm, as shown in FIG. 3(C). If a workpiece (a workpiece material) whose height dimension is 400 mm is cut with the band saw blade 5 tilting as in this case, the cutting deviation is calculated to be 0.37 mm in the lower end portion of the workpiece. In contrast; in a case where the appropriate clearance is 0.1 mm, the cutting deviation is calculated to be 0.7 mm. In short, more precise cutting can be achieved as the appropriate clearance becomes smaller in dimension.

With this taken into consideration, an experiment was carried out on cutting deviation in order to examine a relationship between the width dimension of the band saw blade 5 and the appropriate clearance. The band saw machine which was used for the experiment was PCSAW430 made by Amada Machine Tools Co., Ltd. The band saw blade was SGLB: 54 W×1.6 t×6100 L×⅔ P made by Amada Machine Tools Co., Ltd. The workpiece material was SUS304(JIS)ϕ300 (300 mm diameter). The first cutting condition was that: a blade speed was 45 m/min; and a cutting time for one cut was 15.7 minutes. The second cutting condition was that: a blade speed was 57 m/min; and a cutting time for one cut was 8.8 minutes. General fixed and movable insertion blocks whose dimensions in the left-right direction (the direction in which the band saw blade ran) and vertical dimensions corresponded to a band saw blade with a band width dimension of 54 mm were used as the fixed insertion block 9 and the movable insertion block 15 for holding and guiding the above-mentioned band saw blade.

The result of the experiment under the first cutting condition is as shown in FIG. 2(A). The result of the experiment under the second cutting condition is as shown in FIG. 2(B). The result of each experiment is shown as values which were obtained by actually measuring the cutting deviation dimensions of the cut surfaces of the corresponding workpiece material. In addition, the cutting deviation is represented with a minus sign, because the cutting deviation appeared in the direction in which the product became shorter.

As clear from the results of the experiments, in the case of the first condition, the cutting deviation represented as an actually-measured value was approximately 0.3 mm even when the appropriate clearance (the amount of clearance) was 0.1 mm. In the case of the second condition, the cutting deviation represented as an actually-measured value was approximately 0.7 mm. For these reasons, the amount of clearance needs to fall within a range of 0.00 mm to 0.08 mm in order for the cutting deviation represented as the actually-measured value to be limited to not greater than approximately 0.5 mm. In the case of the second condition, as the amount of clearance changed from 0.05 mm to 0.06 mm, the cutting deviation represented as the actually-measured value changed from −0.2 mm to −0.4 mm.

In this respect, the cutting deviation was 0.37 mm when the workpiece material whose height dimension was 400 mm was cut by use of the band saw blade 5 whose width dimension was 54 mm with the appropriate clearance set at 0.05 mm. For this reason, 54:0.05≅(nearly equals to) 400:037≅(nearly equals to) 1080:1. In other words, S/L=1/1080 where: L denotes the width dimension of the band saw blade 5; and S denotes the appropriate clearance. Accordingly, it is desirable that S/L should be within a range of 1/1000 to 1/1100 with the results of the experiments, shown in FIG. 2(A) and FIG. 2(B), taken into consideration.

Next, descriptions will be provided for a 9th embodiment of the present invention. As conceptually and schematically shown in FIG. 12, a band saw blade guide device 201 according to the 9th embodiment of the present invention includes a main body block 3. Like in the band saw blade guide device in the general vertical and horizontal band saw machines, this main body block 3 includes the back portion supporting member 7, such as a roller or a block depending on the necessity, which is configured to support and guide the back portion of the band saw blade 5. In addition, the main body block 3 integrally includes the fixed-side insertion arm 11 including therein the fixed insertion block 9 that is movable slightly toward the band saw blade 5, and is configured to hold and guide the non-toothed section of the band saw blade 5.

Furthermore, the main body block 3 includes the movable-side insertion arm 13 which is opposed to the fixed-side insertion arm 11. Inside this movable-side insertion arm 13, the movable insertion block 15 configured to hold and guide the band saw blade 5 while opposed to the fixed insertion block 9 is provided movably in directions toward and away from the fixed insertion block 9. Incidentally, in this embodiment, the movable-side insertion arm 13 is integrally provided to the main body block 3. Instead, however, the movable-side insertion arm 13 may be provided movable (turnable) in directions toward and away from the fixed-side insertion arm 11, and fixable in a state of being close to the fixed-side insertion arm 11.

As a configuration for making the movable insertion block 15 movable in the directions toward and away from the fixed insertion block 9, the extremity portion of a slide rod 217 movably penetrating the movable-side insertion arm 13 is integrally connected to the movable insertion block 15. In addition, an elastic member 219, such as a coil spring, configured to bias the movable insertion block 15 in the direction toward and away from the fixed insertion block 9 is elastically installed between a flange portion 217F, which is provided to the base end portion of the slide rod 217, and the movable-side insertion arm 13.

Furthermore, the main body block 3 includes an insertion block pressing unit 221 configured to press the movable insertion block 15 toward the fixed insertion block 9. To put it more specifically, a swingable lever 227 is swingably (turnably) supported by a bracket 223, which is provided to the main body block 3, with the assistance of a pivot 225, and the extremity portion (lower end portion) of this swingable lever 227 is in contact with the flange portion 217F of the slide rod 217. Moreover, the main body block 3 includes a direct-drive actuator 229, such as a fluid-pressure cylinder, for the purpose of swinging the swingable lever 227. The extremity portion of a reciprocating operation member 231, such as a piston rod, which is configured to reciprocate in this direct-drive actuator 229, is in contact with a contacted member 233 which is provided to the base end portion (upper end portion) of the swingable lever 227.

Figure 12:
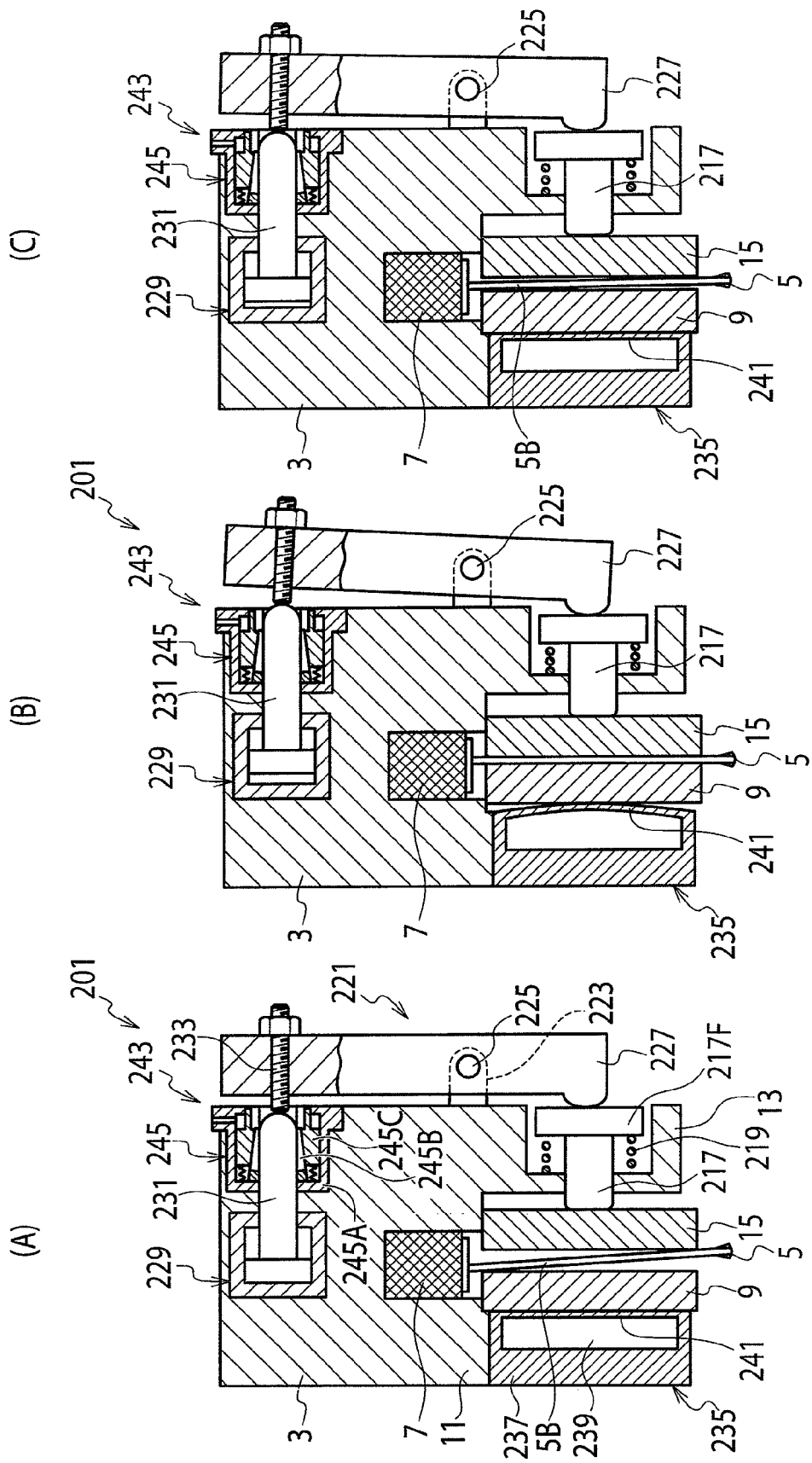
FIGS. 12(A), 12(B) and 12(C) are working explaining diagrams conceptually and schematically showing a configuration of a band saw blade guide device according to a 9th embodiment of the present invention.

With the foregoing configuration, once the direct-drive actuator 229 is put into operation and the swingable lever 227 is turned clockwise in FIG. 12 by the reciprocation operation member 231, the lower end portion of the swingable lever 227 presses the slide rod 217 against the biasing force of the elastic member 219. Accordingly, the movable insertion block 15 is moved toward the fixed insertion block 9, and the non-toothed section of the band saw blade 5 is firmly pressed between the fixed insertion block 9 and the movable insertion block 15.

In the case where the workpiece (whose illustration is omitted) is cut while the band saw blade 5 is firmly pressed between the fixed insertion block 9 and the movable insertion block 15 as described above, the cutting deviation can be inhibited. However, a problem arises that the friction between the band saw blade 5 and each of the two insertion blocks 9, 15 is so large that the two insertion blocks 9, 15 wear out very much.

With this taken into consideration, the present embodiment takes measures to keep the clearance between the fixed insertion block 9 and the movable insertion block 15 at an appropriate clearance corresponding to the thickness of the non-toothed section 5B of the band saw blade 5. To put it specifically, the fixed-side insertion arm 11 in the main body block 3 includes a fixed insertion block slightly-moving unit 235 configured to move the fixed insertion block 9 from the standard position of the fixed insertion block 9 toward the movable insertion block 15 by a minute amount, for example approximately 0.01 mm.

The fixed insertion block slightly-moving unit is formed of a fluid pressure actuator. An actuator main body 237 has a constitution which includes a chamber 239 configured to receive the supply of the working fluid (liquid), such as pressure oil, from a pressure source (whose illustration is omitted). In addition, a contact wall portion 241 of the actuator main body 237 which is in contact with the fixed insertion block 9 is formed thin enough to easily elastically deform due to the pressure of the working fluid supplied to the inside of the chamber 239.

The main body block 3 further includes a movable insertion block arrested state holding unit 243 configured to, when the band saw blade 5 is firmly pressed between (held between) the fixed insertion block 9 and the movable insertion block 15, hold the movable insertion block 15 in a state arrested in the pressing position. In other words, in this embodiment, as the movable insertion block arrested state holding unit 243, a lock cylinder 245 capable of locking the reciprocating operation member 231 of the actuator 229 in the immovable state is provided to the main body block 3.

The lock cylinder 245 has a configuration capable of clamping the reciprocating operation member 231. Even though this configuration is publicly known, a schematic description will be provided as follows. The configuration is that in which: inside a ring-shaped cylinder main body 245A, a taper collet 245B capable of fastening the reciprocating operation member 231 is provided, and a ring-shaped piston 245C configured to make the collet 245B perform a fastening operation is provided in a reciprocatable manner. For this reason, while the lock cylinder 245 is out of operation, the reciprocating operation member 231 of the actuator 229 is capable of reciprocating in the leftward and rightward directions in FIG. 12(A). Once, however, the lock cylinder 245 is put into operation, the collet 245B fastens the reciprocating operation member 231. For this reason, the reciprocating operation member 231 is fixed in an immovable state, and is accordingly put into the arrested state.

In the foregoing configuration, as shown in FIG. 12(A), while the clearance (gap) between the fixed insertion block 9 and the movable insertion block 15 is in the widely opened state, the band saw blade 5 is arranged between the two insertion blocks 9, 15, and the back portion of the band saw blade 5 is brought into contact with the back portion supporting member 7. Furthermore, the contact wall portion 241 is elastically deformed while bent outward in a rounded shape, by supplying the pressure oil to the inside of the chamber 239 of the fixed insertion block slightly-moving unit 235. Thereby, the fixed insertion block 9 moves slightly, for example by approximately 0.01 mm, from the standard position of the fixed insertion block 9 toward the movable insertion block 15 (see FIG. 12(B)).

After that, once the swingable lever 227 is turned clockwise in FIG. 12(B) with the assistance of the reciprocating operation member 231 by putting the actuator 229 into operation, the movable insertion block 15 is moved toward the fixed insertion block 9 with the assistance of the slide rod 217. Accordingly, the band saw blade 5 is firmly pressed between (held between) the fixed insertion block 9 and the movable insertion block 15 in close contact with each other. Once as the movable insertion block arrested state holding unit 243, the lock cylinder 245 is put into operation while the band saw blade 5 is firmly held and fixed between the fixed insertion block 9 and the movable insertion block 15 in close contact with each other as described above, the reciprocating operation member 231 is fixed in the immovable state by the collet 245B provided to the lock cylinder 245.

As a result, the swingable lever 227 and the movable insertion block 15 are prohibited from returning to their original positions are obstructed, and are arrested in the position where the band saw blade 5 is pressed between (held between) the fixed insertion block 9 and the movable insertion block 15 (see FIG. 12(B)). Thereafter, once the pressure oil is discharged from the chamber 239 in the fixed insertion block slightly-moving unit 235, the fixed insertion block 9 returns to its original position.

By this, the clearance between the fixed insertion block 9 and the movable insertion block 15 is slightly opened, and the holding force with which the band saw blade 5 is held between the fixed insertion block 9 and the movable insertion block 15 accordingly becomes weaker. In other words, the clearance between the fixed insertion block 9 and the movable insertion block 15 is kept at the appropriate clearance corresponding to the thickness of the band saw blade 5. For this reason, the friction is reduced between the band saw blade 5 and each of the fixed insertion block 9 and the movable insertion block 15. Concurrently, the band saw blade 5 is prevented from tilting to a large extent between the fixed insertion block 9 and the movable insertion block 15, and the cutting deviation is accordingly inhibited while the workpiece is cut.

Figure 13:
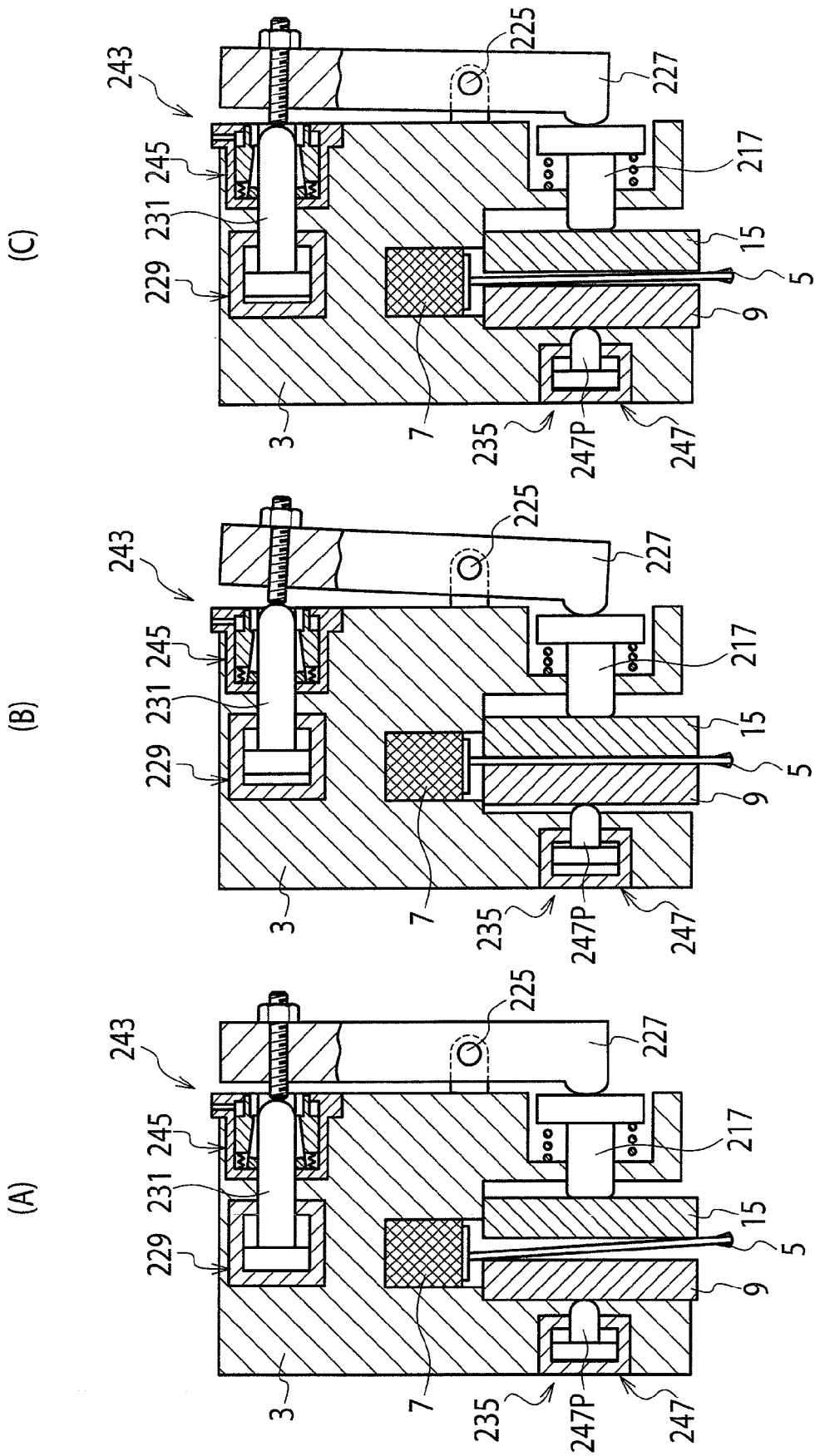
FIGS. 13(A), 13(B) and 13(C) are conceptual, schematic and explanatory diagrams of a band saw blade guide device according to a 10th embodiment.

FIG. 13 shows a 10th embodiment of the present invention. Components which carry out the same functions as do those of the 9th embodiment will be denoted by the same reference numerals, and duplicated descriptions for such components will be omitted. In the 10th embodiment, a fluid pressure cylinder 247 in which a piston rod 247P slightly moves is employed as the configuration of the fixed insertion block slightly-moving unit 235. In other words, the 10th embodiment employs the configuration in which the fixed insertion block 9 is slightly moved by the piston rod 247P from the standard position of the fixed insertion block 9 toward the movable insertion block 15 by putting the fluid pressure cylinder 247 into operation. This configuration can bring about the same effects as can the foregoing embodiments.

Figure 14:
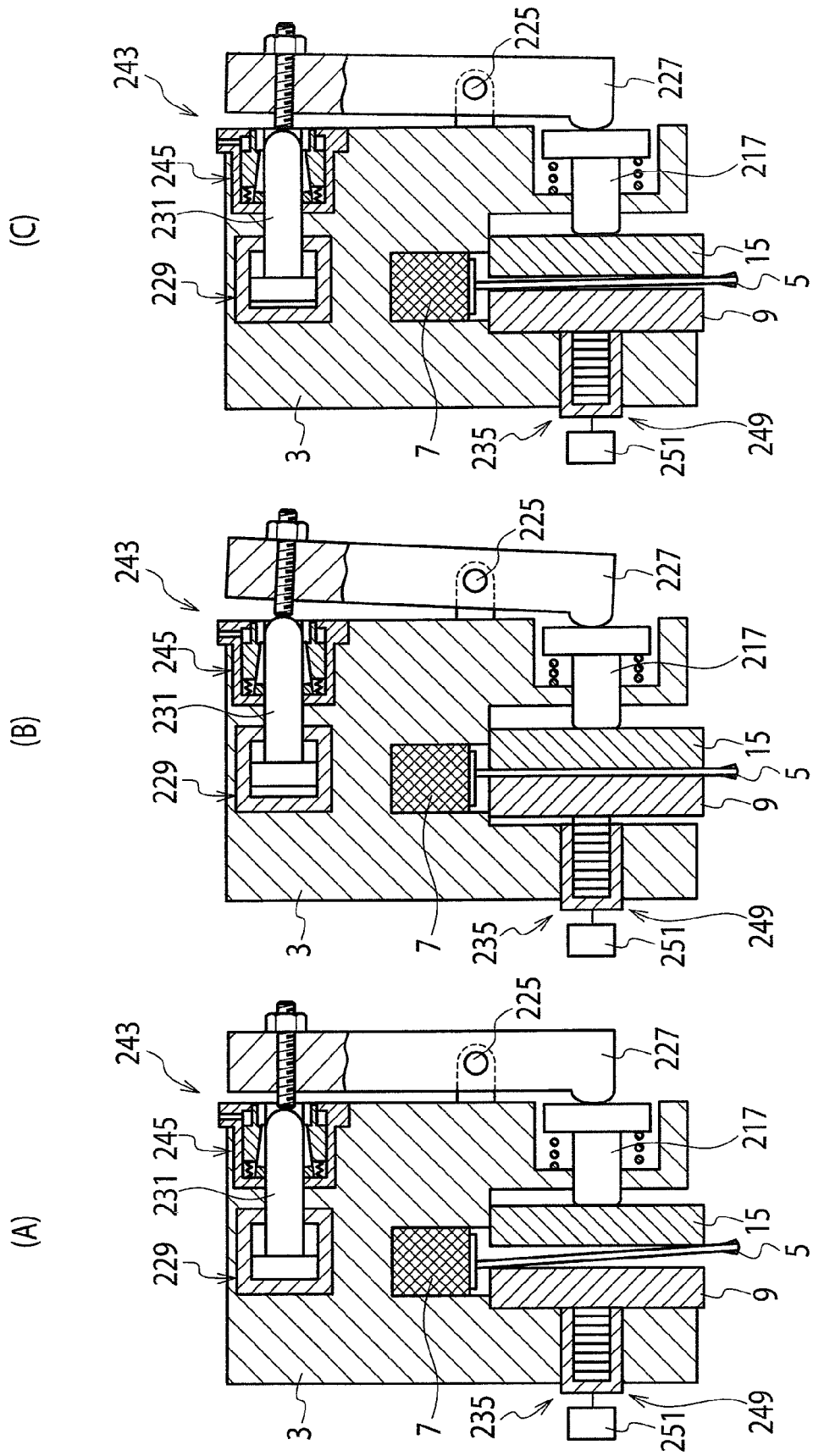
FIGS. 14(A), 14(B) and 14(C) are conceptual, schematic and explanatory diagrams of a band saw blade guide device according to an 11th embodiment.

FIG. 14 shows an 11th embodiment of the present invention. Components which carry out the same functions as do the foregoing embodiments will be denoted by the same reference numerals, and duplicated descriptions for such components will be omitted. In the 11th embodiment, a configuration using a piezoelectric actuator 249 is employed as the configuration of the fixed insertion block slightly-moving unit 235. The piezoelectric actuator 249 is formed of an piezoelectric actuator obtained by stacking multiple piezoelectric elements one on the other and shaping the stack of piezoelectric elements like a rod, and whose displacement in a direction parallel to the axis of the rod (in a direction in which the piezoelectric elements are stacked one on the other) is used. In addition, a voltage applying unit 251 is connected to the piezoelectric actuator 249. The voltage applying unit 251 is designed to control an amount of displacement of the piezoelectric actuator 249. The voltage applying unit 251 has a configuration in which a voltage can be applied to all or a desired number of the multiple stacked piezoelectric elements, or the voltage application can be cancelled, for example by manipulating a dial.

In the foregoing configuration, a minute amount of movement of the fixed insertion block 9 from its standard position toward the movable insertion block 15 is controllable by selecting how many piezoelectric elements the voltage should be applied to through the operation of the voltage applying unit 251. For this reason, the clearance between the fixed insertion block 9 and the movable insertion block 15 can be adjusted at a more appropriate clearance than in the foregoing embodiments.

It should be noted that: the present invention is not limited to the foregoing embodiments alone and can be carried out in other modes by making changes whenever deemed necessary. For example, the case where the lock cylinder 245 provided with the collet 245B capable of fastening the reciprocating operation member 231 is employed has been shown as an instance of the movable insertion block arrested state holding unit 243. It suffices, however, that the movable insertion block arrested state holding unit 243 has the function capable of holding the movable insertion block 15 in the state arrested in the position where the band saw blade 5 is firmly held between the fixed insertion block 9 and the movable insertion block 15.

For this reason, the lock cylinder 245 may be replaced with a fluid pressure cylinder configured to cause the reciprocating operation member 231 to be pressed and fixed by a piston rod. Alternatively, a configuration in which the slide rod 217 is pressed or fixed by a piston rod of a fluid pressure cylinder may be used instead of the configuration in which the reciprocation operation member 231 is fixed. Otherwise, a configuration in which the swingable lever 227 is fixed with a wedge member placed between the main body block 3 and the swingable lever 227 in an engageable and disengageable manner. In sum, the present invention can be carried out as various modified modes.

Figure 15:
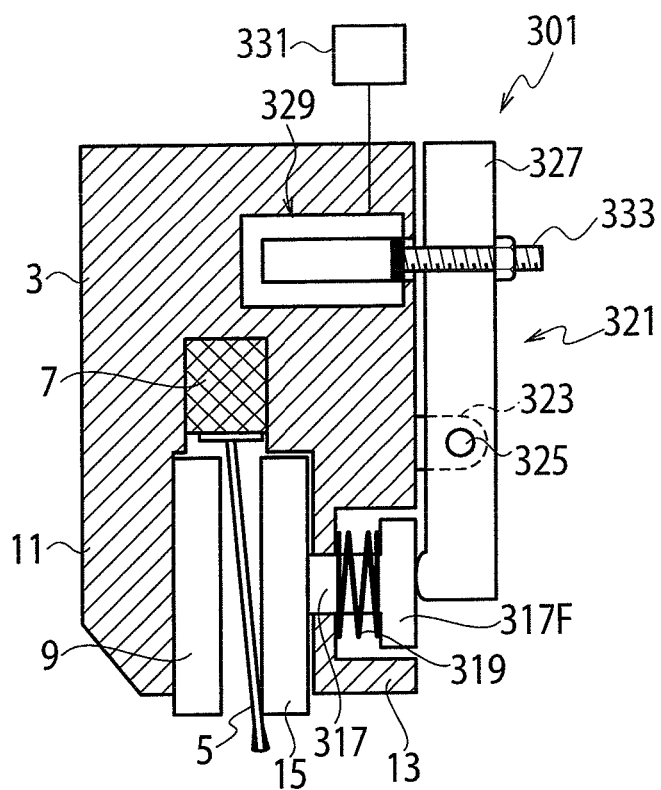
FIG. 15 is an explanatory diagram conceptually and schematically showing a configuration of a band saw blade guide device according to a 12th embodiment of the present invention.

Next, descriptions will be provided for a 12th embodiment of the present invention. As shown in FIG. 15, a band saw blade guide device 301 according to the 12th embodiment of the present invention includes the main body block 3, and this main body block 3 includes the back portion supporting member 7 configured to support and guide a back portion of the band saw blade 5. In addition, the main body block 3 includes: the fixed-side insert arm 11 which integrally supports the fixed insertion block 9 configured to hold and guide the non-toothed section of the band saw blade 5; and the movable-side arm 13 opposed to the fixed-side insert arm 11. In addition, this movable-side arm 13 includes the movable insertion block 15 that is movable in the directions toward and away from the fixed insertion block 9 and is capable of holding the non-toothed section of the band saw blade 5 with the fixed insertion block 9.

To this end, a slide rod 317 whose extremity is integrally connected to the movable insertion block 15 is slidably supported by the movable-side arm 13. In addition, an appropriate elastic member 319, such as a spring coil, which is configured to bias the movable insertion block 15 in the direction toward and away from the fixed insertion block 9 is elastically installed between a flange portion 317F provided to the base end portion of this slide rod 317 and the movable-side arm 13.

For this reason, while in the normal state, the clearance between the fixed insertion block 9 and the movable insertion block 15 is in a relatively widely opened state for the purpose of making it easy for the band saw blade 5 to be attached and detached.

An insertion block pressing unit 321 is provided to the side surface of the main body block 3 in order to press the movable insertion block 15 toward the fixed insertion block 9, while the clearance (gap) between the fixed insertion block 9 and the movable insertion block 15 is widely opened with the movable insertion block 15 moved in the direction away from the fixed insertion block 9. To this end, a swingable lever 327 is swingably (turnably) supported by a bracket 323, which is provided to the side surface of the main body block 3, with the assistance of a pivot 325. The extremity portion (lower end portion) of this swingable lever 327 is in contact with the flange portion 317F of the slide rod 317.

Furthermore, the main body block 3 includes an actuator 329 in order to provide a pressing force to the swingable lever 327 which serves as the insertion block pressing unit 321. This actuator 329 includes an piezoelectric actuator obtained by stacking multiple piezoelectric elements one on the other and shaping the stack of piezoelectric elements like a rod, and which displacement in the direction parallel to the axis of the rod (in the direction in which the piezoelectric elements are stacked one on the other) is used. Moreover, a voltage applying unit 331 is connected to the piezoelectric actuator 329. The voltage applying unit 331 is designed to control an amount of displacement of the piezoelectric actuator 329. The voltage applying unit 331 has the configuration in which a voltage can be applied to all or a desired number of the multiple stacked piezoelectric elements, or the voltage application can be cancelled, for example by manipulating a dial.

A pressed member 333 to be pressed by the piezoelectric actuator 329 is provided to the swingable lever 327 at a position corresponding to the piezoelectric actuator 329. This pressed member 333 is made, for example, from an adjustable screw which is screwed to the swingable lever 327. The pressed member 333 is formed in a way that is capable of adjusting the length by which the pressed member 333 projects out from the swingable lever 327 toward the piezoelectric actuator 329. For this reason, even in a case where the amount of displacement of the piezoelectric actuator 329 is small, the position in the movable range of the lower end portion of the swingable lever 327 can be adjusted in the leftward and rightward directions in FIG. 15.

In the foregoing configuration, as shown in FIG. 15, while the clearance between the fixed insertion block 9 and the movable insertion block 15 is in the widely opened state, the band saw blade 5 is inserted into the clearance, and the back portion of the band saw blade 5 is brought into contact with the back portion supporting member 7. Thereafter, once the voltage is applied to all the piezoelectric elements in the piezoelectric actuator 329, the piezoelectric actuator 329 provides large displacement. Accordingly, the movable insertion block 15 is moved by the swingable lever 327 toward the fixed insertion block 9, and as shown in FIG. 16, the band saw blade 5 is firmly held between the fixed insertion block 9 and the movable insertion block 15.

Figure 16:
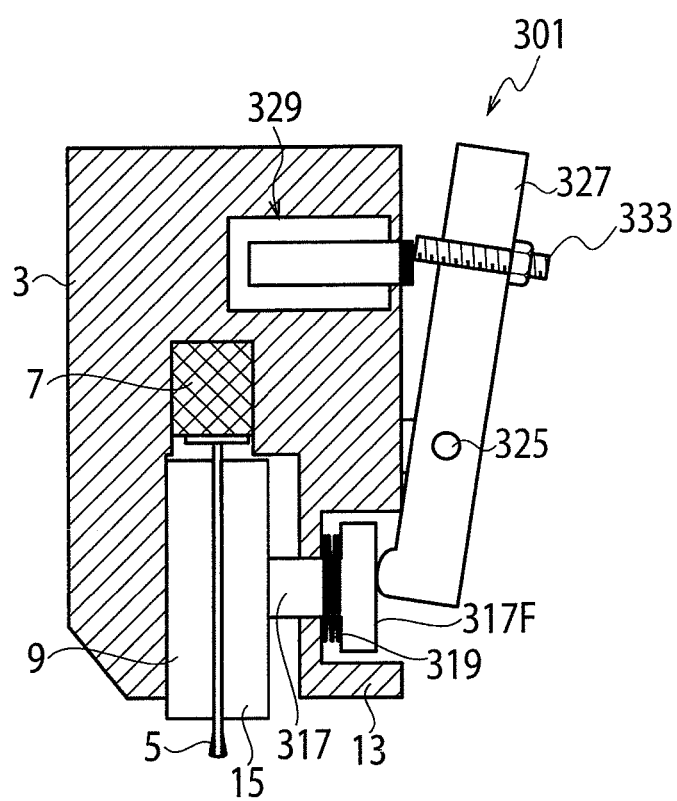
FIG. 16 is a working explaining diagram of the band saw blade guide device according to the 12th embodiment of the present invention.
Figure 17:
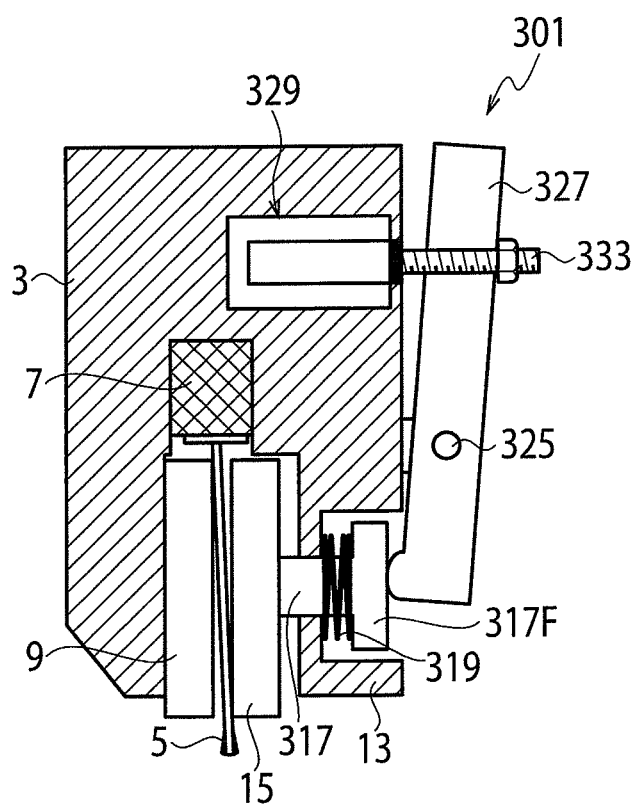
FIG. 17 is the other working explaining diagram of the band saw blade guide device according to the 12th embodiment of the present invention.

Afterward, once the application of the voltage to a smaller and appropriate number of piezoelectric elements is cancelled under the control of the voltage applying unit 331, the amount of displacement of the piezoelectric actuator 329 becomes smaller as shown in FIG. 16. Accordingly, the holding force with which the band saw blade 5 is held between the fixed insertion block 9 and the movable insertion block 15 can be made weaker or reduced to zero.

Noted that the foregoing descriptions have been provided for the configuration in which after the band saw blade 5 is firmly pressed between the fixed insertion block 9 and the movable insertion block 15 by applying the voltage to all the piezoelectric elements in the piezoelectric actuator 329, the holding force exerted on the band saw blade 5 is made weaker or reduced to zero by cancelling the application of the voltage to the smaller and appropriate number of piezoelectric elements. However, the band saw blade 5 also may be held between the fixed insertion block 9 and the movable insertion block 15 with a weak holding force by applying the voltage to only a desired number of piezoelectric elements, or with no holding force, from the beginning.

To put it specifically, the band saw blade 5 may be held with the weaker holding force or with no holding force by setting the number of piezoelectric elements to which the voltage should be applied in the piezoelectric actuator 329, and by applying the voltage to only the set number of piezoelectric elements, because: the clearance dimension when the clearance (gap) between the fixed insertion block 9 and the movable insertion block 15 is opened to the maximum is already known; the dimension from the position at which the swingable lever 327 presses the flange portion 317F of the slide rod 317 to the pivot 325 is already known; the dimension from the pressed member 333 to the pivot 325 is already known; and the thickness of the non-toothed section of the band saw blade 5 is already known.

In this case, the allowable range of the holding force at which the non-toothed section of the band saw blade 5 is held between the fixed insertion block 9 and the movable insertion block 15 is beforehand experimentally found for the thickness of the non-toothed section of each band saw blade 5; the number of piezoelectric elements to which the voltage should be applied is beforehand found corresponding to the holding force; data on the thickness of the non-toothed section of the band saw blade 5 or data on the band saw blade 5, as well as data on the holding force and data the number of electrically-applied piezoelectric elements, together with their mutual association, is beforehand stored in a memory (whose illustration is omitted) of the voltage applying unit 331. Thereby, a configuration may be established in which the voltage is automatically applied to the necessary number of piezoelectric elements on the basis of data which is selected from memory corresponding to the thickness of the non-toothed section of the band saw blade 5 in use.

In other words, a band saw blade selecting unit is provided to the voltage applying unit 331; and once the band saw blade 5 to be used is selected through this band saw blade selecting unit, the piezoelectric actuator 329 is automatically put into operation on the basis of a relevant set of data stored in the memory, and accordingly, the holding force with which the band saw blade 5 is held between the fixed insertion block 9 and the movable insertion block 15, namely the clearance dimension between the two insertion blocks 9, 15, can be set at the appropriate value.

As understood through the foregoing explanation, when in the band saw blade guide device, the band saw blade 5 is held between and guided by the fixed insertion block 9 and the movable insertion block 15 by moving the movable insertion block 15 toward the fixed insertion block 9, the holding force produced by the two insertion blocks 9, 15 or the clearance dimension between the two insertion blocks 9, 15 can be set at a desired appropriate value by applying the voltage to the desired number of piezoelectric elements in the piezoelectric actuator formed by stacking the multiple piezoelectric elements one on the other. In other words, the simple configuration makes it possible to easily adjust the holding force for holding the band saw blade 5 and/or the clearance between the two insertion blocks 9, 15 at an appropriate value.

Next, descriptions will be provided for a 13th embodiment of the present invention. As conceptually and schematically shown in FIG. 18, a band saw blade guide device 401 according to the 13th embodiment of the present invention includes the main body block 3; and like in a band saw blade guide device in general vertical and horizontal band saw machines, this main body block 3 includes the appropriate back portion supporting member 7, such as a roller or a block, configured to support and guide the back portion of the band saw blade 5. In addition, the main body block 3 integrally includes the fixed-side insertion arm 11 which integrally includes the fixed insertion block 9, configured to hold and guide the non-toothed section of the band saw blade 5, inside the fixed-side insertion arm 11.

Furthermore, the main body block 3 includes the movable-side insertion arm 13 which is opposed to the fixed-side insertion arm 11. Inside this movable-side insertion arm 13, the movable insertion block 15 configured to hold and guide the band saw blade 5 while opposed to the fixed insertion block 9 is provided movably in the directions toward and away from the fixed insertion block 9. Incidentally, in this embodiment, the movable-side insertion arm 13 is integrally provided to the main body block 3. Instead, however, the movable-side insertion arm 13 may be provided movable (turnable) in the directions toward and away from the fixed-side insertion arm 11, and fixable in a state of being close to the fixed-side insertion arm 11.

As a configuration for making the movable insertion block 15 movable in the directions toward and away from the fixed insertion block 9, the extremity portion of a slide rod 417 movably penetrating the movable-side insertion arm 13 is integrally connected to the movable insertion block 15. In addition, an elastic member 419, such as a coil spring, configured to bias the movable insertion block 15 in the direction toward and away from the fixed insertion block 9 is elastically installed between a flange portion 417F, which is provided to the base end portion of the slide rod 417, and the movable-side insertion arm 13.

Furthermore, the main body block 3 includes an insertion block pressing unit 421 configured to press the movable insertion block 15 toward the fixed insertion block 9. To put it more specifically, a swingable lever 427 is swingably (turnably) supported by a bracket 423, which is provided to the main body block 3, with the assistance of a pivot 425, and the extremity portion (lower end portion) of this swingable lever 427 is in contact with the flange portion 417F of the slide rod 417. Moreover, the main body block 3 includes a direct-drive actuator 429, such as a fluid-pressure cylinder, for the purpose of swinging the swingable lever 427. The extremity portion of a reciprocating operation member 431, such as a piston rod, which reciprocates in the direct-drive actuator 429, is in contact with a contacted member 433 which is provided to the base end portion (upper end portion) of the swingable lever 427.

Figure 18:
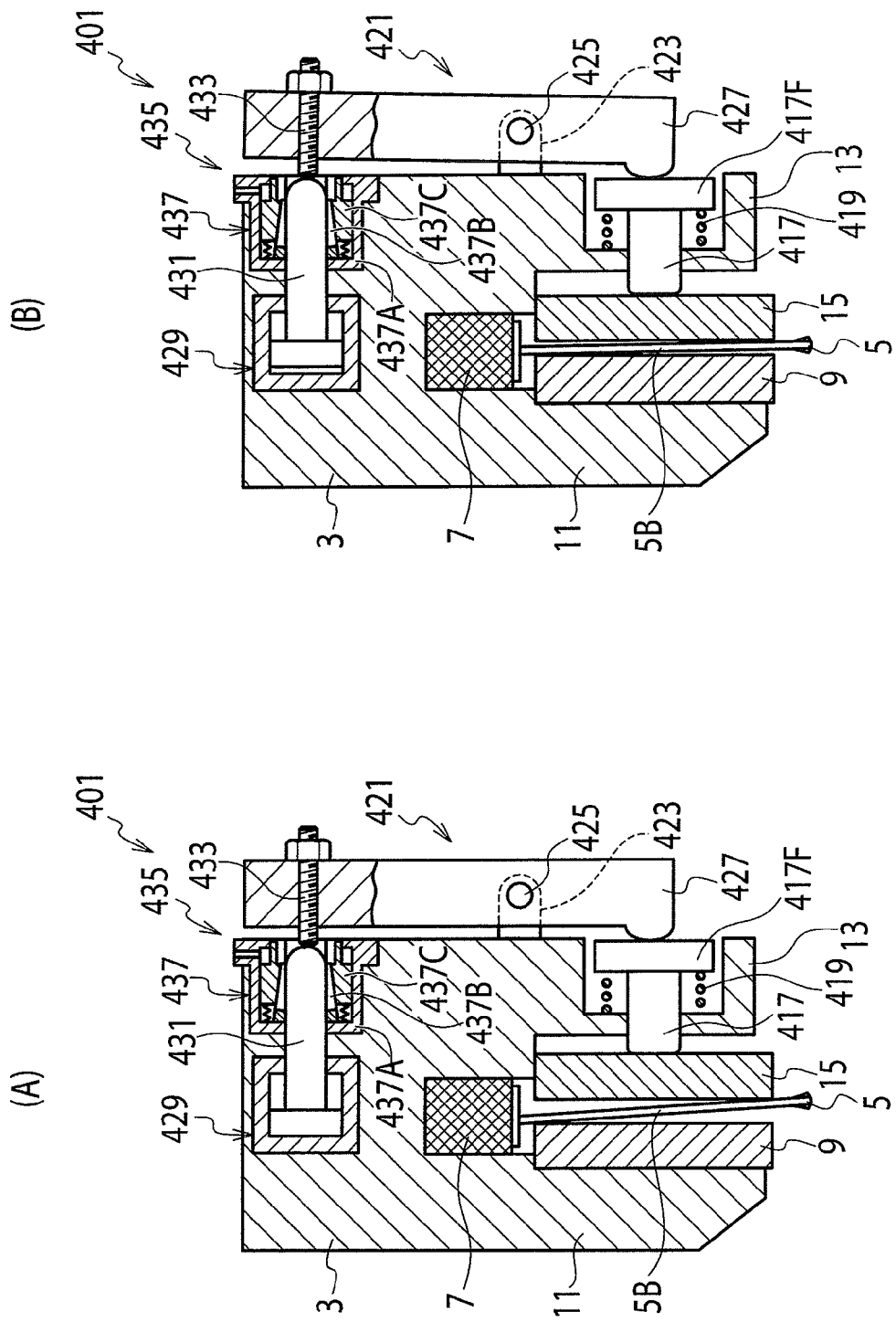
FIGS. 18(A) and 18(B) are explanatory diagrams conceptually and schematically showing a configuration of a band saw blade guide device according to a 13th embodiment of the present invention.

With the foregoing configuration, once the direct-drive actuator 429 is put into operation and the swingable lever 427 is turned clockwise in FIG. 18 with the assistance of the reciprocating operation member 431, the lower end portion of the swingable lever 427 presses the slide rod 417 against the biasing force of the elastic member 419. Accordingly, the movable insertion block 15 is moved toward the fixed insertion block 9, and the non-toothed section of the band saw blade 5 is firmly pressed between (held between) the fixed insertion block 9 and the movable insertion block 15.

When a workpiece (whose illustration is omitted) is cut with the band saw blade 5 firmly pressed between the fixed insertion block 9 and the movable insertion block 15 as described above, cutting deviation can be inhibited. However, a problem arises that the friction between the band saw blade 5 and each of the two insertion blocks 9, 15 is large, and that the two insertion blocks 9, 15 wear down very much.

With this taken into consideration, the present embodiment takes measures to keep the clearance between the fixed insertion block 9 and the movable insertion block 15 at an appropriate clearance corresponding to the thickness of the non-toothed section 5B of the band saw blade 5. To put it specifically, as an example of the pressing operation unit configured to press and operate the swingable lever 427 in the insertion block pressing unit 421, the actuator 429 is designed to press the swingable lever 427 with a certain pressing force which is beforehand experimentally determined. In other words, in a case where the actuator 429 includes a fluid pressure cylinder such as a hydraulic cylinder, a working fluid (pressure oil) with a predetermined certain pressure is supplied. In addition, in a case where the actuator 429 includes a ball screw mechanism to be rotated, for example, by a motor, the motor is rotated with predetermined certain torque.

As understood from the foregoing configuration, once the band saw blade 5 is pressed between (held between) the fixed insertion block 9 and the movable insertion block 15 by turning the swingable lever 427 clockwise in FIG. 18 by putting the actuator 429 as the pressing operation member into operation, the holding force with which the band saw blade 5 is held between the fixed insertion block 9 and the movable insertion block 15 becomes equal to the beforehand-set appropriate holding force. For this reason, the friction between the band saw blade 5 and each of the fixed insertion block 9 and the movable insertion block 15 will not become larger than is necessary.

Furthermore, the main body block 3 includes an insertion block arresting/holding unit 435 configured to arrest and hold the movable insertion block 15 in the pressing/holding position (pressing position) when the band saw blade 5 is pressed by and held between (pressed between) the fixed insertion block 9 and the movable insertion block 15 with the appropriate holding force (holding/pressing force) as described above. In other words, in this embodiment, as the insertion block arresting/holding unit 435, a lock cylinder 437 capable of locking the reciprocating operation member 431 of the actuator 429 in an immovable state is provided to the main body block 3.

The lock cylinder 437 has a configuration capable of clamping the reciprocating operation member 431. Although the configuration is publicly known, let us schematically explain the configuration as follows. In the configuration, inside a ring-shaped cylinder main body 437A, a taper collet 437B capable of fastening the reciprocating operation member 431 is provided, and a ring-shaped piston 437C configured to make the collet 437B perform a fastening operation is provided in a reciprocatable manner. Accordingly, while the lock cylinder 437 is out of operation, the reciprocating operation member 431 in the actuator 429 is capable of reciprocating in the leftward and rightward directions in FIG. 18. Once, however, the lock cylinder 437 is put into operation, the collet 437B fastens the reciprocating operation member 431. As a result, the reciprocating operation member 431 is fixed in an immovable state, and is put into the arrested state.

With the foregoing configuration, as shown in FIG. 18(A), while the clearance (gap) between the fixed insertion block 9 and the movable insertion block 15 is in the widely opened state, the band saw blade 5 is placed between the two insertion blocks 9, 15, and concurrently, the back portion of the band saw blade 5 is brought into contact with the back portion supporting member 7. Thereafter, once the actuator 429 constituting a part of the pressing operation unit is put into operation, the swingable lever 427 is turned clockwise in FIG. 18(A), and accordingly, the band saw blade 5 is held between the fixed insertion block 9 and the movable insertion block 15.

In this event, because the pressing force of the actuator 429 is a pressing force which is beforehand set experimentally, the band saw blade 5 will never be held between (pressed between) the fixed insertion block 9 and the movable insertion block 15 more firmly than is necessary, and the band saw blade 5 is held with the beforehand-set appropriate pressing force. As described above, when the band saw blade 5 is held between the fixed insertion block 9 and the movable insertion block 15, the clearance (gap) between the fixed insertion block 9 and the movable insertion block 15 becomes equal to the appropriate clearance corresponding to the thickness of the band saw blade 5.

Thereafter, once the lock cylinder 437 serving as the insertion block arresting/holding unit 435 is put into operation while the band saw blade 5 is held between the fixed insertion block 9 and the movable insertion block 15 as above described, the reciprocating operation member 431 in the actuator 429 is locked in the immovable state. Accordingly, the movable insertion block 15 is held in the state arrested in the pressing position (holding position) where the band saw blade 5 is pressed and held.

As a result, the holding force with which the band saw blade 5 is held between the fixed insertion block 9 and the movable insertion block 15 is equal to the appropriate holding force, and the clearance between the fixed insertion block 9 and the movable insertion block 15 is kept at the appropriate clearance corresponding to the thickness of the band saw blade 5. For these reason, the friction between the band saw blade 5 and each of the fixed insertion block 9 and the movable insertion block 15 will never become larger than is necessary, and the band saw blade 5 can be inhibited from tilting in the clearance between the fixed insertion block 9 and the movable insertion block 15 to a large extent. This makes it possible to solve the conventional problems which have been described above.

It should be noted that: the present invention is not limited to the 13th embodiment described above and can be carried out in other modes by making changes whenever deemed necessary. For example, the case where the lock cylinder 437 including the collet 437B capable of fastening the reciprocating operation member 431 is employed as the insertion block arresting/holding unit 435 has been shown as the instance of the 13th embodiment. However, it suffices that the insertion block arresting/holding unit 435 has the function of being capable of holding the movable insertion block 15 in the arrested state in the position where the band saw blade 5 is held between the fixed insertion block 9 and the movable insertion block 15 with the appropriate holding force.

For this reason, the lock cylinder 437 may be replaced with a fluid pressure cylinder configured to press and fix the reciprocating operation member 431 by use of a piston rod. Alternatively, a configuration in which the slide rod 417 is pressed and fixed by a piston rod of a fluid pressure cylinder may be employed instead of the configuration in which the reciprocating operation member 431 is fixed. Otherwise, a configuration in which the swingable lever 427 is fixed by placing a wedge member in the interstice between the main body block 3 and the swingable lever 427 in an engageable and disengageable manner. In other words, the 13th embodiment can be carried out in various modified modes.

Next, descriptions will be provided for a 14th embodiment of the present invention. As conceptually and schematically shown in FIG. 19, a band saw blade guide device 501 according to the 14th embodiment of the present invention includes the main body block 3; and like in a band saw blade guide device in general vertical and horizontal band saw machines, this main body block 3 includes the appropriate back portion supporting member 7, such as a roller or a block, configured to support and guide the back portion of the band saw blade 5. In addition, the main body block 3 integrally includes the fixed-side insertion arm 11 which integrally includes the fixed insertion block 9, configured to hold and guide the non-toothed section of the band saw blade 5, inside the fixed-side insertion arm 11.

Furthermore, the main body block 3 includes the movable-side insertion arm 13 which is opposed to the fixed-side insertion arm 11. Inside this movable-side insertion arm 13, the movable insertion block 15 configured to hold and guide the band saw blade 5 while opposed to the fixed insertion block 9 is provided movably in the directions toward and away from the fixed insertion block 9. Incidentally, in this embodiment, the movable-side insertion arm 13 is integrally provided to the main body block 3. Instead, however, the movable-side insertion arm 13 may be provided movable (turnable) in the directions toward and away from the fixed-side insertion arm 11, and fixable in a state of being close to the fixed-side insertion arm 11.

As the configuration for making the movable insertion block 15 movable in the directions toward and away from the fixed insertion block 9, a slide member 519 is fitted into a guide recess portion 517, which is formed in the movable-side insertion arm 13, movably in the directions toward and away from the fixed insertion block 9. In addition, this slide member 519 and the movable insertion block 15 are integrally connected together by use of an appropriate fixing connecting member (whose illustration is omitted), such as a fixing screw.

Furthermore, for the purpose of holding the band saw blade 5 between the fixed insertion block 9 and the movable insertion block 15 by pressing and moving the movable insertion block 15 toward the fixed insertion block 9, a pressing screw member 521 is screwed to the movable-side insertion arm 13 at a position corresponding to the guide recess portion 517 in a way that the pressing screw member 521 can move in the directions toward and away from the fixed insertion block 9. Moreover, the extremity portion of the pressing screw member 521 is in contact with the slide member 519.

In addition, as an example of the lock unit configured to lock the pressing screw member 521 in an immovable state, a lock nut 523 is screwed to the pressing screw member 521. Incidentally, as the configuration of the lock unit configured to lock the pressing screw member 521 in the immovable state, a configuration may be employed in which: a screw hole extending in a direction orthogonal to the axis of the pressing screw member 521 is provided in the main body block 3; and the extremity portion of a set screw to be screwed into this screw hole is firmly pressed against the pressing screw member 521.

Figure 19:
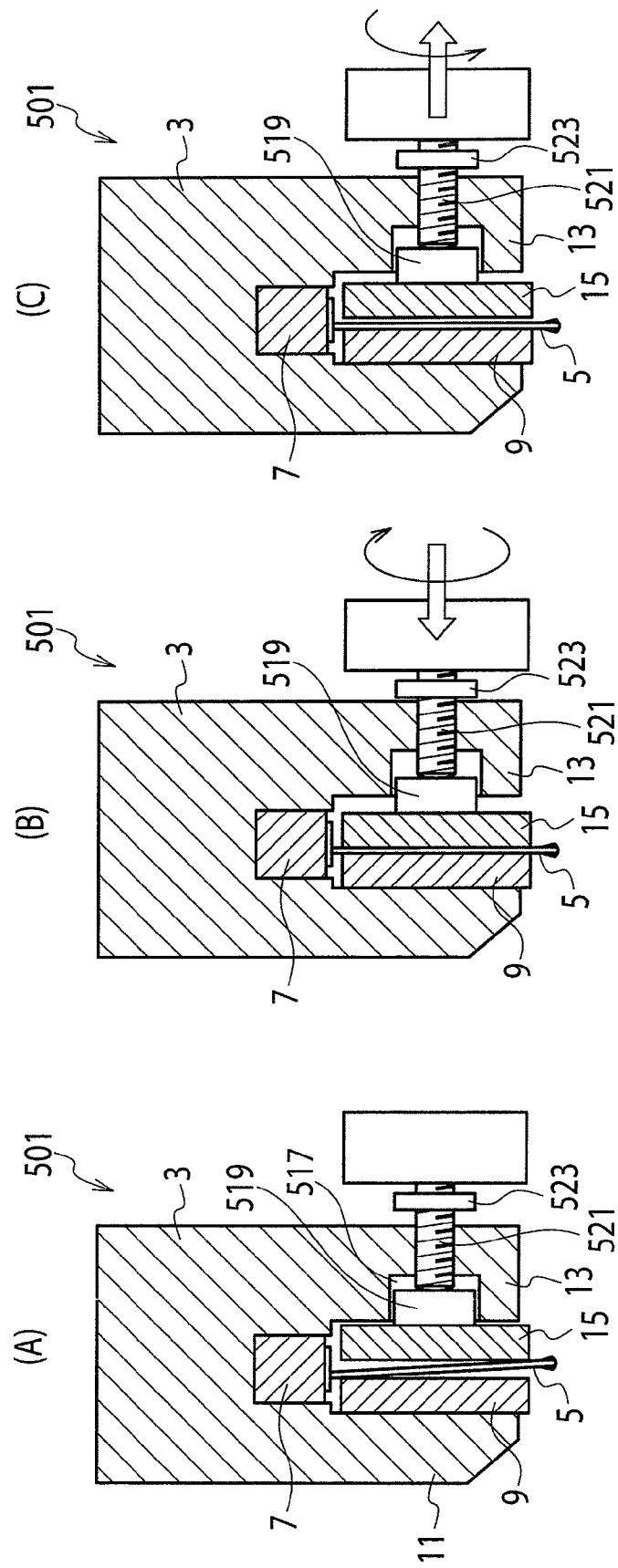
FIGS. 19(A), 19(B) and 19(C) are wording explaining diagrams conceptually and schematically showing a configuration of a band saw blade guide device according to a 14th embodiment of the present invention.

With the foregoing configuration, while the clearance (gap) between the fixed insertion block 9 and the movable insertion block 15 in the band saw blade guide device 501 is in the widely opened state as shown in FIG. 19, the band saw blade 5 is inserted into the interstice between the two insertion blocks 9, 15, and the back portion of the band saw blade 5 is brought into contact with the back portion supporting member 7. Thereafter, once the pressing screw member 521 is fastened by being rotated clockwise (rotated in the forward diction), the movable insertion block 15 is moved toward the fixed insertion block 9, and the non-toothed section of the band saw blade 5 is firmly pressed by and held between the fixed insertion block 9 and the movable insertion block 15. In other words, the band saw blade 5 is firmly pressed between the fixed insertion block 9 and the movable insertion block 15 in close contact with each other.

Once the band saw blade 5 is firmly pressed by and held between (pressed between) the fixed insertion block 9 and the movable insertion block 15 as described above, the band saw blade 5 gets into close contact with the two insertion blocks 9, 15, and accordingly, the clearance between the band saw blade 5 and the two insertion blocks 9, 15 is reduced to zero. After that, once the pressing screw member 521 is returned slightly, for example by approximately 0.01 mm, by turning the pressing screw member 521 in the reverse direction by an appropriate rotational angle, for example by a quarter turn, or by a haft turn, the holding force with which the band saw blade 5 is held between the fixed insertion block 9 and the movable insertion block 15 becomes weaker.

In other words, the clearance between the fixed insertion block 9 and the movable insertion block 15 is opened slightly wider, and the clearance is kept at the appropriate clearance corresponding to the thickness of the non-toothed section of the band saw blade 5. For this reason, thereafter, once the pressing screw member 521 is locked in the immovable state by fastening the lock nut 523 as the example of the lock unit, the clearance between the fixed insertion block 9 and the movable insertion block 15 continues to be kept at the appropriate clearance corresponding to the thickness of the band saw blade 5.

As understood from the foregoing explanation, the simple mechanical configuration, that is to say, the simple rotational operation of the pressing screw member 521 for its fastening and unfastening, makes it possible to easily adjust the clearance between the fixed insertion block 9 and the movable insertion block 15 in the band saw blade guide device 501 at the appropriate clearance corresponding to the thickness of the band saw blade 5, and accordingly to solve the conventional problems which have been described above.

Figure 20:
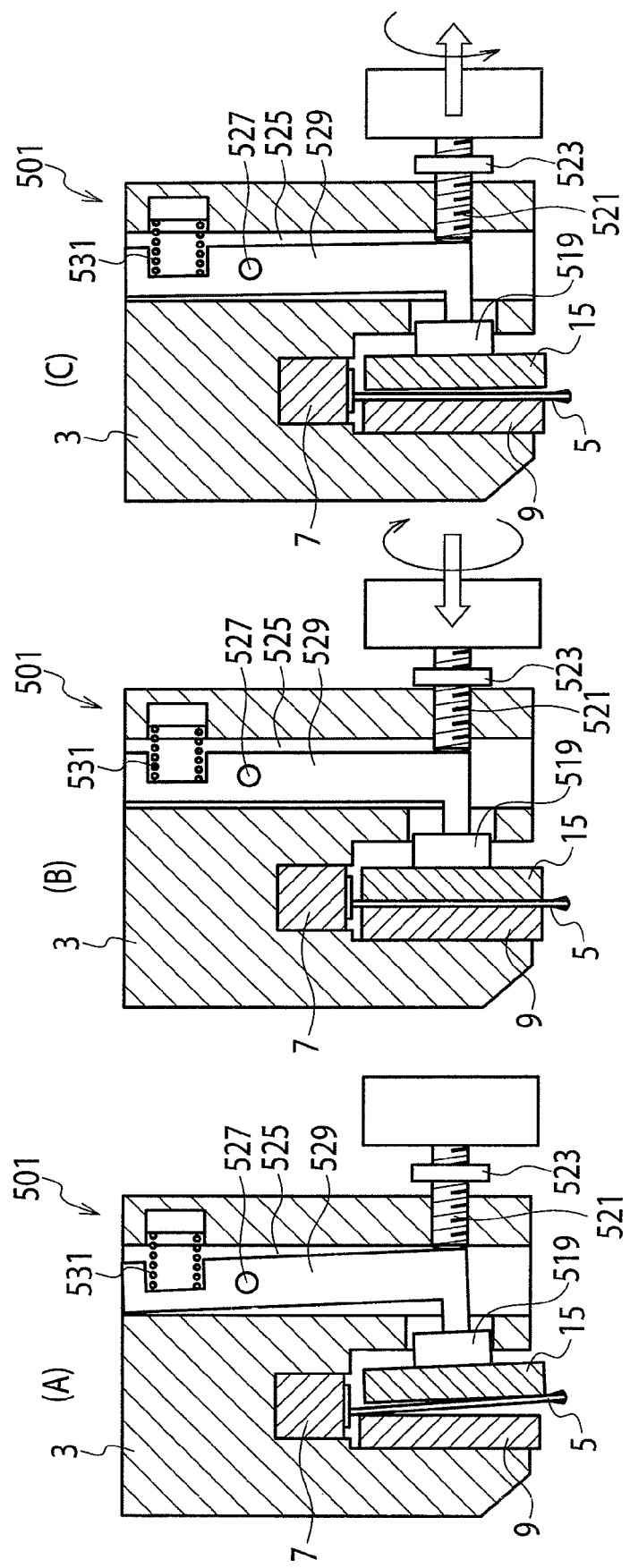

FIG. 20 shows a 15th embodiment of the present invention. Components which carryout the same functions as do those of the foregoing embodiments will be denoted by the same reference numerals, and duplicated descriptions for such components will be omitted.

The 15th embodiment employs a configuration in which a swingable lever 529 is swingably provided inside a vertical through-hole 525, which is formed in the main body block 3, with the assistance of a hinge pin 527. The directions in which the lower end portion of the swingable lever 529 swings is the directions in which the lower end portion of the swingable lever 529 is pressed by the pressing screw member 521, that is to say, the directions toward and away from the fixed insertion block 9. In addition, the lower end portion of the swingable lever 529 and the slide member 519 are integrally connected together. Furthermore, for the purpose of biasing the lower end portion of the swingable lever 529 in the direction toward and away from the fixed insertion block 9, an elastic member 531, such as a coil spring, is elastically installed between the swingable lever 529 and the inner peripheral surface of the through-hole 525.

Through an operation similar to that carried out in the 14th embodiment, the 15th embodiment having the foregoing configuration makes it possible to adjust the clearance between the fixed insertion block 9 and the movable insertion block 15 at the appropriate clearance corresponding to the thickness of the band saw blade 5. Incidentally, the foregoing configuration can positively and actively move the movable insertion block 15 away from the fixed insertion block 9 when the pressing screw member 521 is moved away from the fixed insertion block 9 by being turned counterclockwise, because the elastic member 531 is provided there.

Figure 21:
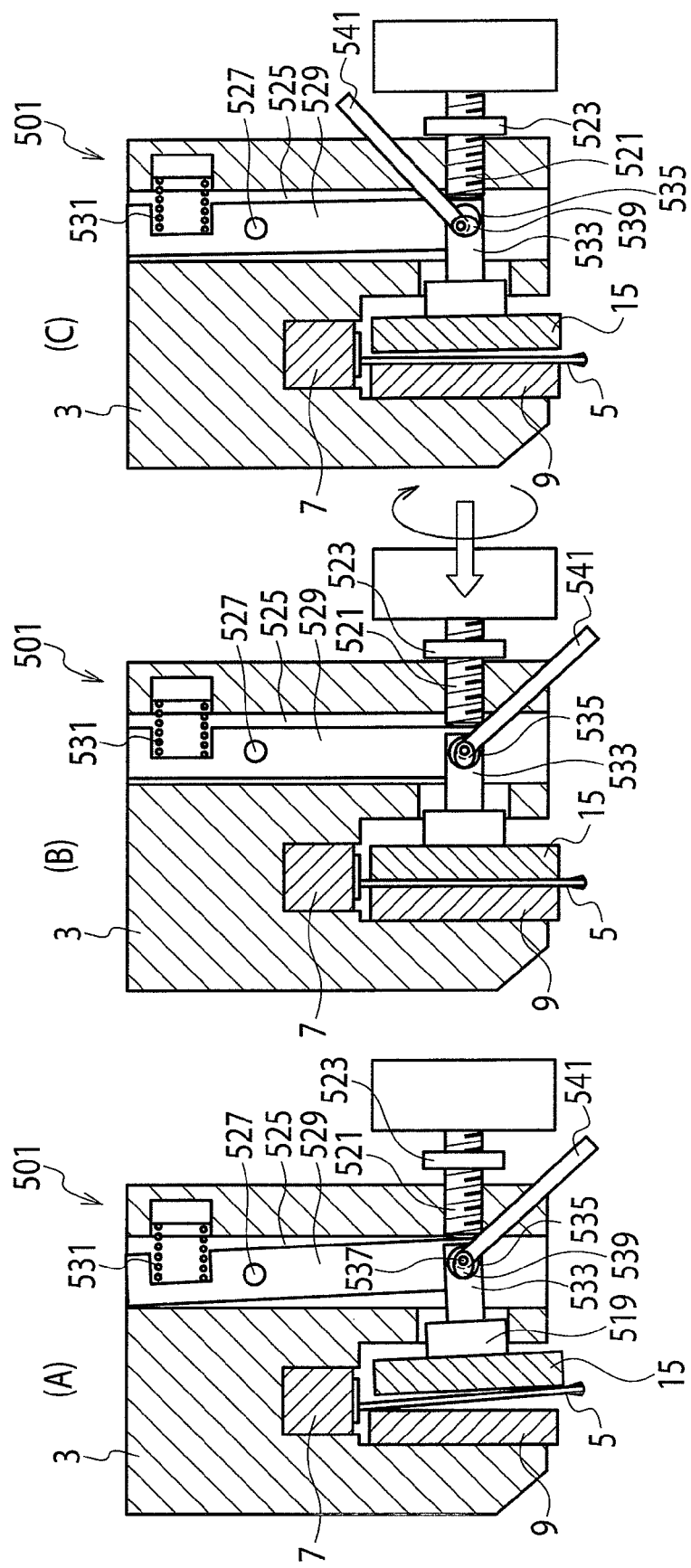
FIGS. 21(A), 21(B) and 21(C) are conceptual, schematic and explanatory diagrams of a band saw blade guide device according to a 16th embodiment.

FIG. 21 shows a 16th embodiment of the present invention. The 16th embodiment employs a configuration in which an intermediate member 533 slightly movable in the direction in which the intermediate member 533 presses the movable insertion block 15 is provided to the lower end portion of the swingable lever 529. To put it specifically, the intermediate member 533 is integrally provided to the slide member 519, and is provided to the lower end portion of the swingable lever 529 in the way slightly movable. More specifically, a circular through-hole 535 is horizontally provided to the intermediate member 533 in order for the intermediate member 533 to be moved in a direction in which the intermediate member 533 presses the movable insertion block 15 relative to the swingable lever 529, or in the opposite direction; and a cam member 539, such as an elongated or eccentric cam, which is fixed to a rotary shaft 537 rotatably supported by the swingable lever 529, is fitted into this through-hole 535. In addition, a manipulation lever 541 is provided to the rotary shaft 537.

For this reason, turning the cam member 539 by manipulating the manipulation lever 541 changes a contact position between the outer peripheral surface of the cam member 539 and a portion of the inner peripheral surface of the through-hole 535 which is closer to the movable insertion block 15. Thereby, the intermediate member 533 can move slightly in the leftward and rightward directions in FIG. 21 relative to the swingable lever 529.

In the foregoing configuration, once as shown in FIG. 21(A), the pressing screw member 521 is fastened while a portion of the cam member 539 having a large diameter is in contact with the portion of the inner peripheral surface of the through-hole 535 closer to the slide member 519, and concurrently the band saw blade 5 is placed between the fixed insertion block 9 and the movable insertion block 15 in the widely opened state, the movable insertion block 15 is moved toward the fixed insertion block 9 with the assistance of the swingable lever 529 and the intermediate member 533. Accordingly, the band saw blade 5 is firmly pressed between the fixed insertion block 9 and the movable insertion block 15 while being in close contact with the two insertion blocks. After that, the pressing screw member 521 is locked in the immovable state by fastening the lock nut 523 as the lock unit.

Thereafter, once the cam member 539 is turned by manipulating the manipulation lever 541 to bring a portion of the cam member 539 having a lower diameter into contact with a portion of the inner peripheral surface of the through-hole 535 closer to the slide member 519, the movable insertion block 15 moves by a slight amount, for example by appropriately 0.01 mm, in the direction in which the movable insertion block 15 becomes father from the band saw blade 5. This makes weaker the holding force with which the band saw blade 5 is held between the fixed insertion block 9 and the movable insertion block 15. Thus, the band saw blade 5 is held in between with the weaker holding force. In other words, the clearance between the fixed insertion block 9 and the movable insertion block 15 can be easily kept at the appropriate clearance corresponding to the thickness of the band saw blade 5. Accordingly, this embodiment can bring about the same effects as can the foregoing embodiments.

It should be noted that: the present invention is not limited to the 14th to 16th embodiments alone and can be carried out in other modes by making changes whenever deemed necessary. For example, a configuration may be employed in that the movable insertion block 15 is directly pressed by the pressing screw member 521 and the intermediate member 533.

Next, descriptions will be provided for a 17th embodiment of the present invention. As conceptually and schematically shown in FIG. 22, a band saw blade guide device 601 according to the 17th embodiment of the present invention includes the main body block 3; and like in a band saw blade guide device in the general vertical and horizontal band saw machines, this main body block 3 includes the appropriate back portion supporting member 7, such as a roller or a block, configured to support and guide a back portion 5A of a band saw blade 5. In addition, the main body block 3 integrally includes the fixed-side insertion arm 11 which integrally includes the fixed insertion block 9, configured to hold and guide the non-toothed section 5B of the band saw blade 5, inside the fixed-side insertion arm 11.

Furthermore, the main body block 3 includes the movable-side insertion arm 13 which is opposed to the fixed-side insertion arm 11. Inside this movable-side insertion arm 13, the movable insertion block 15 configured to hold and guide the band saw blade 5 while opposed to the fixed insertion block 9 is provided movably in the directions toward and away from the fixed insertion block 9. Incidentally, in this embodiment, the movable-side insertion arm 13 is integrally provided to the main body block 3. Instead, the movable-side insertion arm 13 may be provided to be movable (turnable) in the directions toward and away from the fixed-side insertion arm 11, and to be fixable in the state close to the fixed-side insertion arm 11.

As the configuration for making the movable insertion block 15 movable in the directions toward and away from the fixed insertion block 9, the extremity portion of a slide rod 617 movably penetrating the movable-side insertion arm 13 is integrally connected to the movable insertion block 15. In addition, an elastic member 619, such as a coil spring, configured to bias the movable insertion block 15 in the direction away from the fixed insertion block 9 is elastically installed between a flange portion 617F, which is provided to the base end portion of the slide rod 617, and the movable-side insertion arm 13.

Furthermore, the main body block 3 includes an insertion block pressing unit 621 configured to press and move the movable insertion block 15 toward the fixed insertion block 9. To put it more specifically, a swingable lever 627 is swingably (turnably) supported by a bracket 623, which is provided to the main body block 3, with the assistance of a pivot 625, and the extremity portion (lower end portion) of this swingable lever 627 is in contact with the flange portion 617F of the slide rod 617. Moreover, the main body block 3 includes a direct-drive actuator 629, such as a fluid-pressure cylinder, for the purpose of swinging the swingable lever 627. The extremity portion of a reciprocating operation member 631, such as a piston rod, which performs reciprocating movements in this direct-drive actuator 629, is in contact with a contacted member 633 which is provided to the base end portion (upper end portion) of the swingable lever 627.

Figure 22:
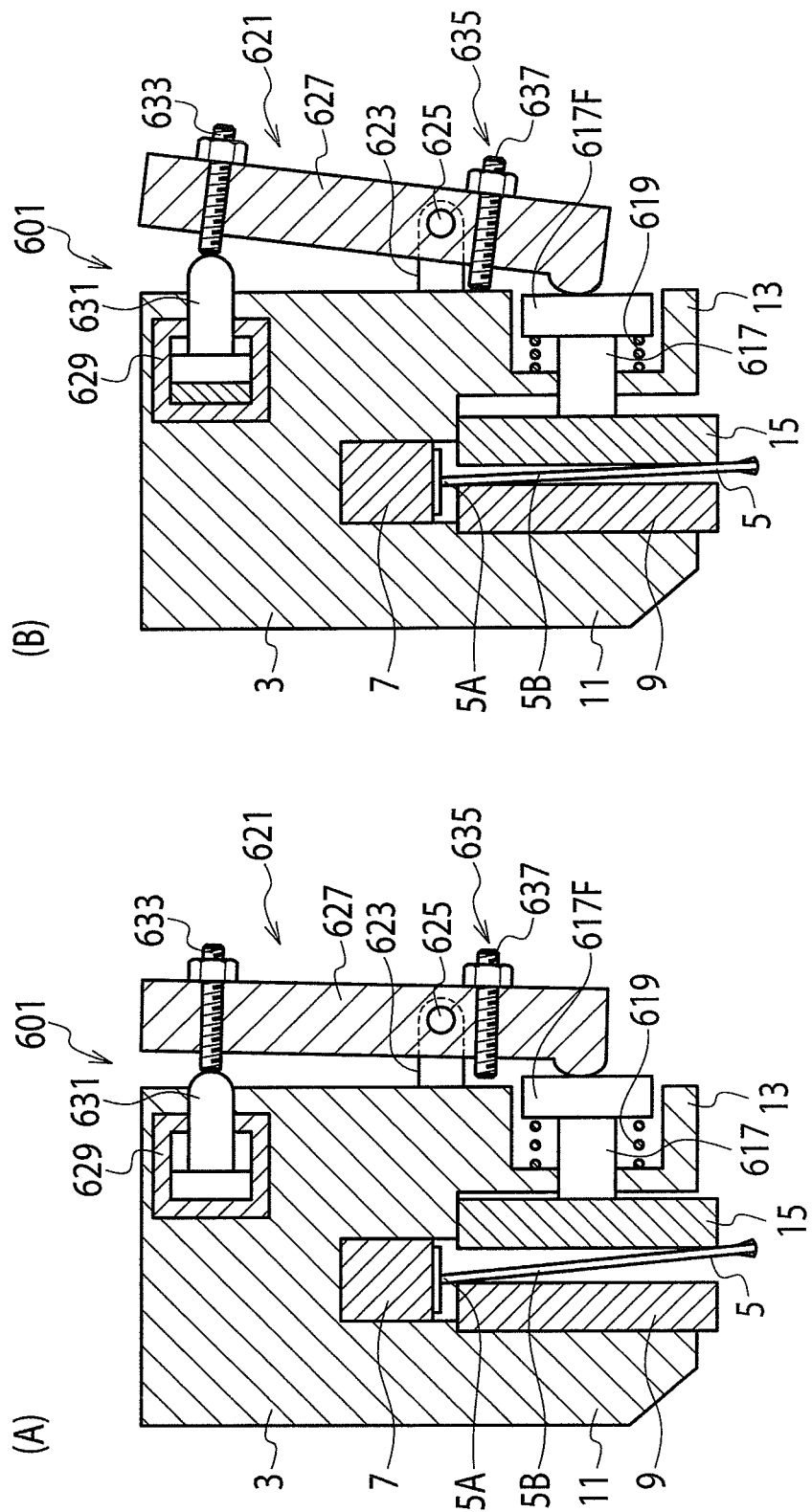
FIGS. 22(A) and 22(B) are working explaining diagrams conceptually and schematically showing a configuration of a band saw blade guide device according to a 17th embodiment of the present invention.

With the foregoing configuration, once the direct-drive actuator 629 is put into operation and the swingable lever 627 is turned clockwise in FIG. 22 by the reciprocating operation member 631, the lower end portion of the swingable lever 627 presses the slide rod 617 against the biasing force of the elastic member 619. Accordingly, the movable insertion block 15 is moved toward the fixed insertion block 9, and the non-toothed section of the band saw blade 5 is firmly pressed between the fixed insertion block 9 and the movable insertion block 15.

When a workpiece (whose illustration is omitted) is cut with the band saw blade 5 firmly pressed between the fixed insertion block 9 and the movable insertion block 15 as described above, cutting deviation can be inhibited. However, a problem arises that the friction between the band saw blade 5 and each of the two insertion blocks 9, 15 is large, and that the insertion blocks 9, 15 wear down very much.

With this taken into consideration, the present embodiment includes an action position restricting unit 635 configured to restrict an action position of the insertion block pressing unit 621, for the purpose of keeping the clearance between the fixed insertion block 9 and the movable insertion block 15 at a clearance which is beforehand set corresponding to the thickness of the non-toothed section 5B of the band saw blade 5. To put it specifically, the action position restricting unit 635 includes a stopper member 637, such as an adjustable screw, adjustable to project out from the swingable lever 627 toward the main body block 3 by a desired length, and having an extremity portion capable of coming into contact with the main body block 3.

For this reason, once the action of the swingable lever 627 is restricted by the contact of the extremity portion of the stopper member 637 into the main body block 3, restriction is imposed on the further advancement of the movable insertion block 15 toward the fixed insertion block 9 than necessary. This makes it possible to inhibit the non-toothed section 5B of the band saw blade 5 from being firmly pressed between the fixed insertion block 9 and the movable insertion block 15. Accordingly, the clearance between the fixed insertion block 9 and the movable insertion block 15 can be kept at the appropriate clearance corresponding to the thickness of the band saw blade 5. In other words, the cutting deviation can be effectively inhibited when the workpiece is cut with the band saw blade 5, and the friction between the band saw blade 5 and each of the fixed insertion block 9 and the movable insertion block 15 can be kept small.

It should be noted that, because the action position restricting unit 635 exerts the function of adjusting the clearance between the fixed insertion block 9 and the movable insertion block 15 at the appropriate clearance corresponding to the thickness of the non-toothed section 5B of the band saw blade 5, the action position restricting unit 635 may be called a clearance adjusting unit as well. Incidentally, as the configuration capable of adjusting the clearance between the fixed insertion block 9 and the movable insertion block 15 when the fixed insertion block 9 and the movable insertion block 15 hold and guide the non-toothed section 5B of the band saw blade 5, a configuration may be employed in which: the contacted member 633 includes the adjustable screw; and the length by which the contacted member 633 projects out toward the reciprocating operation member 631 is adjustable. In this case, the contacted member 633 may be called an action position restricting unit (clearance adjusting unit).

In the foregoing configuration, the non-toothed section 5B of the band saw blade 5 is placed between the fixed insertion block 9 and the movable insertion block 15, and the back portion 5A of the band saw blade 5 is brought into contact with the back portion supporting member 7, while the clearance between the fixed insertion block 9 and the movable insertion block 15 is in the widely opened state with the movable insertion block 15 being far from the fixed insertion block 9 to a large extent, that is to say, while the movable insertion block 15 is situated in the standard position.

Subsequently, the length by which at least one of the contacted member (adjustable screw) 633 and the stopper member (adjustable screw) 637 projects, as the example of the action position restricting unit 635, is adjusted. Thereby, the clearance is set in advance between the fixed insertion block 9 and the movable insertion block 15 for making the band saw blade 5 held between and guided by the two insertion blocks 9, 15. Thereafter, the direct-drive actuator 629 is put into operation. Thus, as described above, the swingable lever 627 is swung, and the movable insertion block 15 is moved toward the fixed insertion block 9. In this event, the range of the movement of the swingable lever 627 is limited to the position which has been previously set by the action position restricting unit 635.

For this reason, the clearance between the fixed insertion block 9 and the movable insertion block 15 while the non-toothed section 5B of the band saw blade 5 is held between the fixed insertion block 9 and the movable insertion block 15 by closing the movable insertion block 15 is kept at the previously-set appropriate clearance. This makes it possible to inhibit the cutting deviation while the workpiece is being cut, and to reduce the frictional resistance between the band saw blade 5 and each of the fixed insertion block 9 and the movable insertion block 15.

Figure 23:
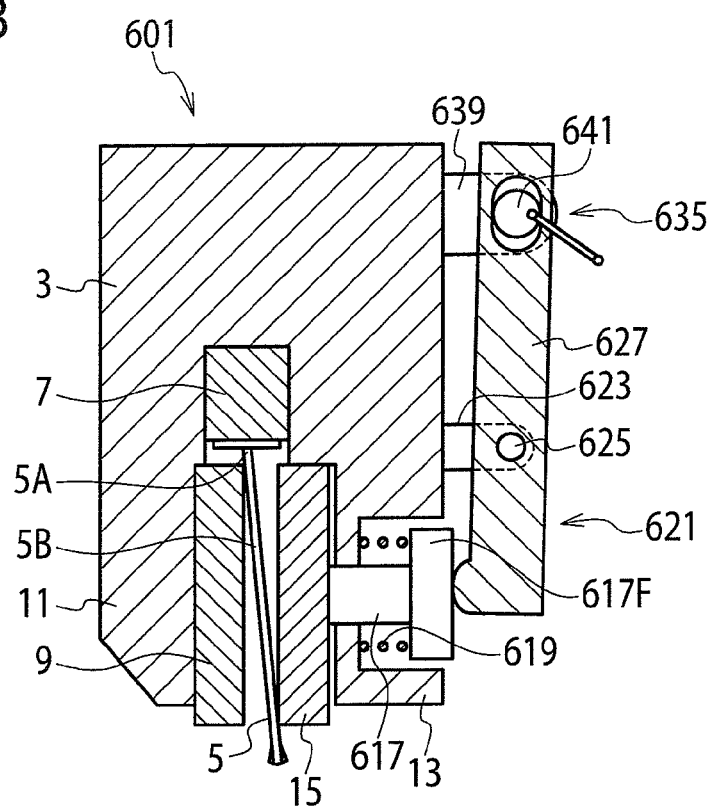
FIG. 23 is a conceptual, schematic and explanatory diagram of a band saw blade guide device according to an 18th embodiment.

It should be noted that: the present invention is not limited to the foregoing embodiment and can be carried out in other embodiments. To put it specifically, with regard to the configuration of the action position restricting unit 635, the band saw blade guide device 601 according to an 18th embodiment of the present may employ, for example, a configuration in which: as shown in FIG. 23, an eccentric cam 641 is rotatably provided to a bracket 639 which is provided to the main body block 3; and the eccentric portion of this eccentric cam 641 is rotatably fitted into an elongated hole which is provided to the upper portion of the swingable lever 627. In this configuration, once the eccentric cam 641 is rotated, the swingable lever 627 is swung about the pivot 625. For this reason, when the rotational position of the eccentric cam 641 is adjusted and the eccentric cam 641 is subsequently locked by a lock unit (whose illustration is omitted), the clearance between the fixed insertion block 9 and the movable insertion block 15, between which the band saw blade 5 is held, can be adjusted at the appropriate clearance corresponding to the thickness of the band saw blade 5.

Figure 24:
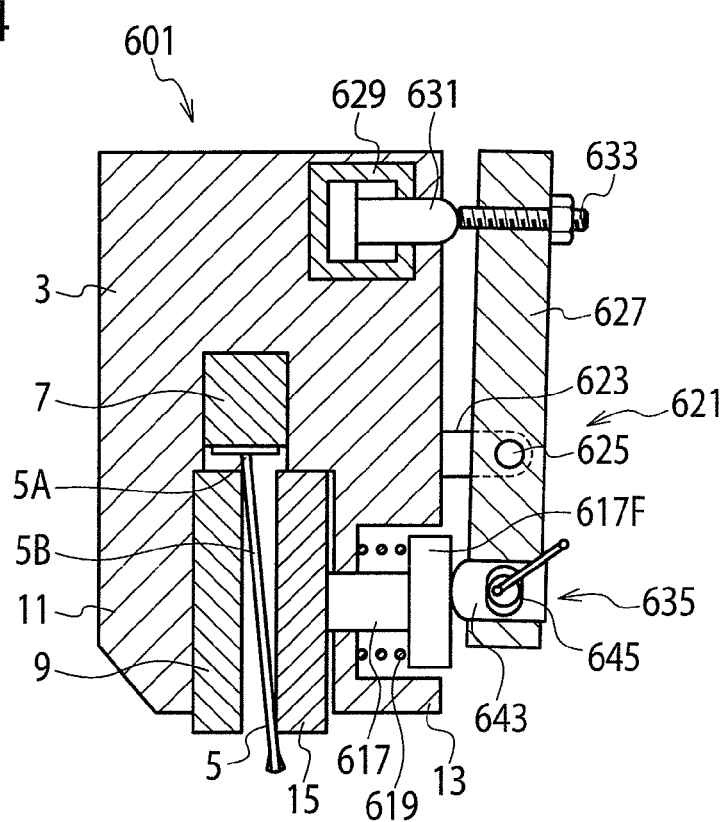
FIG. 24 is a conceptual, schematic and explanatory diagram of a band saw blade guide device according to a 19th embodiment.

In addition, with regard to the configuration of the action position restricting unit 635, the band saw blade guide device 601 according to a 19th embodiment of the present invention may also employ a configuration in which, as shown in FIG. 24, a pressing member 643 configured to press the slide rod 617 is provided to the extremity portion of the swingable lever 627 in a way that is capable of adjusting the length by which the pressing member 643 projects out. With regard to the configuration for adjusting the length by which the pressing member 643 projects out, the band saw blade guide device 601 according to the 19th embodiment may also employ a configuration in which: an eccentric cam 645 is rotatably provided to the extremity portion of the swingable lever 627; the eccentric portion of this eccentric cam 645 is rotatably fitted into an elongated hole which is provided to the pressing member 643; and thereby, the length by which the pressing member 643 projects out is adjusted by the rotation of the eccentric cam 645. Otherwise, a configuration may be employed in which the slide rod 617 is directly pressed by the eccentric portion of the eccentric cam 645.

Furthermore, a configuration may be employed in which: a polygonal eccentric cam in which dimensions from the rotational center to the sides are different from one another is rotationally provided to the main body block 3; the upper portion of the swingable lever 627 is pressed by this eccentric cam; and thereby, the range of the swing of the swingable lever 627 is restricted.

As understood from the foregoing explanation, the clearance between the fixed insertion block 9 and the movable insertion block 15 between which the band saw blade 5 is held and guided can be beforehand adjusted corresponding to the thickness of the band saw blade 5, and thus set at the appropriate clearance. In addition, because the movable insertion block 15 can be mechanically fixed in the immovable state when the band saw blade 5 is held, it is possible to simplify the overall configuration of the band saw blade guide device 601.

It should be noted that the entire contents of Japanese Patent Applications No. 2010-004917 (filed on Jan. 13, 2010), No. 2009-241594 (filed on Oct. 20, 2009), No. 2009-241596 (filed on Oct. 20, 2009), No. 2009-241603 (filed on Oct. 20, 2009), No. 2009-241609 (filed on Oct. 20, 2009) and No. 2009-241615 (filed on Oct. 20, 2009) are incorporated herein by reference.

The present invention is not limited to the foregoing embodiments thereof, and can be carried out in various other embodiments by making changes whenever deemed necessary.

The invention claimed is:

1. A method of holding a band saw blade by means of a band saw blade guide device in a band saw machine, comprising:
   in the process of holding a non-toothed section of the band saw blade between a fixed insertion block provided at a first side insertion arm of a main body block and a movable insertion block provided to be movable at a second side insertion arm of the main body block in a direction toward and away from the fixed insertion block, moving the movable insertion block via a return allowing unit, the return allowing unit including a pressing force transmitting member and a passive member, the pressing force transmitting member pressed and moved by an actuator configured to move the movable insertion block toward the fixed insertion block, the passive member passively moved by the movement of the pressing force transmitting member and movable relative to the pressing force transmitting member;
   firmly holding the band saw blade between the fixed insertion block and the movable insertion block;
   fixing one of the pressing force transmitting member and the passive member of the return allowing unit in fixed state with respect to the main body block by use of a fixing unit; and
   returning the other one of the pressing force transmitting member and the passive member and the movable insertion block by a previously-set amount of return such that the movable insertion block is returned to a fixed state by the fixing unit, and such that a clearance between the fixed insertion block and the movable insertion block is maintained in relation to a thickness of the band saw blade.

2. The method of holding a band saw blade by means of a band saw blade guide device according to claim 1, wherein the clearance is within a range of S/L of $1/1000$ to $1/100$ where L denotes a width dimension of the band saw blade, and S denotes a value obtained by subtracting a thickness dimension of the band saw blade from a clearance dimension between the fixed insertion block and the movable insertion block.

3. A band saw blade guide device in a band saw machine, comprising:
   a main body block including a back portion supporting member supporting and guiding a back portion of a band saw blade, a fixed insertion block configured to hold and guide a non-toothed section of the band saw blade, and a movable insertion block provided opposed to the fixed insertion block;
   an actuator moving the movable insert block toward the fixed insertion block;
   an insertion block moving unit provided between the actuator and the movable insertion block, and configured to move the movable insertion block in response to an operation of the actuator; and
   a return allowing unit included in the insertion block moving unit and including a pressing force transmitting member, a passive member and an elastic member, wherein:
   the pressing force transmitting member is configured to transmit a pressing force of the actuator to the movable insertion block to firmly hold the band saw blade with the fixed insertion block,
   the passive member is configured to be pressed by the pressing force transmitting member and is further configured to be movable relative to the pressing force transmitting member,
   the elastic member is configured to bias the movable insertion block with respect to the fixed insertion block,
   the return allowing unit includes the pressing force transmitting member having a slider which is movably provided to the main body block, and the passive member having a hollow slider, the slider movably provided inside the hollow slider, the pressing force transmitting member directly pressed by the actuator, the passive member passively moved by the movement of the pressing force transmitting member, the band saw blade guide device further comprises a fixing unit configured to fix the insertion block moving unit including the return allowing unit with respect to the main body block such that the fixing unit fixes the passive member when the band saw blade is held between the fixed insertion block and the movable insertion block, and then the actuator retracts allowing the slider and the movable insertion block to slide back from a biased position due to an action of the elastic member within a movable ran e of the slider inside the hollow slider, and the return allowing unit allows the pressing force transmitting member and the movable insertion block to return by a previously-set amount of return, as the slider is moved within the hollow slider when the actuator is returned to an initial state after the hollow slider in the return allowing unit is fixed by the fixing unit, such that after the pressing force of the actuator is removed and the slider returns to an unbiased position due to the action of the elastic member, the band saw blade is still held between the fixed insertion block and the movable insertion block while the hollow slider is fixed by the fixing unit, so as to maintain a clearance between the fixed insertion block and the movable insertion block in relation to a thickness of the band saw blade.

4. A band saw blade guide device, comprising:

main body block having a fixed insertion block and a movable insertion block movable toward and away from the fixed insertion block;

an actuator configured to move the movable insertion block toward the fixed insertion block;

an insertion-block mover provided between the actuator and the movable insertion block and configured to move the movable insertion block toward the fixed insertion block, the insertion-block mover comprising:

a slider movable toward and away from the actuator and provided with a slide rod adapted to engage with a movable member of the actuator;

a restrainer for restraining the movement of the slider between a first position and a second position in the restrainer, the restrainer movable toward and away from the actuator independently of the slider;

an elastic member configured to urge the restrainer to move toward the actuator; and a mechanical fixator configured to stop the movement of the restrainer by fixing the restrainer to the main body block.

5. The device of claim 4, wherein the restrainer includes a hollow slider.

* * * * *